(12) United States Patent
Hansell et al.

(10) Patent No.: US 10,020,677 B2
(45) Date of Patent: Jul. 10, 2018

(54) SYSTEM, METHOD, AND APPARATUS FOR GRID LOCATION

(71) Applicants: Astrolink International LLC, Bethesda, MD (US); Dominion Energy Technologies, Inc., Richmond, VA (US)

(72) Inventors: Jerritt Harold Hansell, Boulder, CO (US); Alan Drew Barnett, Escondido, CA (US); Joseph Robert Reed, Escondido, CA (US); Henrik Fernand Bernheim, Denver, CO (US)

(73) Assignees: Astrolink International LLC, Bethesda, MD (US); Dominion Energy Technologies, Inc., Richmond, VA (US)

( * ) Notice: Subject to any disclaimer, the term of this patent is extended or adjusted under 35 U.S.C. 154(b) by 0 days.

(21) Appl. No.: 15/852,496

(22) Filed: Dec. 22, 2017

(65) Prior Publication Data

US 2018/0123389 A1    May 3, 2018

Related U.S. Application Data

(63) Continuation of application No. 14/929,087, filed on Oct. 30, 2015, now Pat. No. 9,853,498.
(Continued)

(51) Int. Cl.
    *H02J 1/00*      (2006.01)
    *H02J 13/00*     (2006.01)
    *H04B 3/56*      (2006.01)

(52) U.S. Cl.
    CPC ............ *H02J 13/0017* (2013.01); *H04B 3/56* (2013.01); *H04B 2203/5466* (2013.01);
    (Continued)

(58) Field of Classification Search
    CPC .................... Y02E 60/723; H04B 2203/5466
    See application file for complete search history.

(56) References Cited

U.S. PATENT DOCUMENTS 4,200,770 A    4/1980  Hellman et al.
4,371,867 A    2/1983  Gander
(Continued)

FOREIGN PATENT DOCUMENTS

CN    101770007 A    7/2010
EP    0395495 A1    10/1990
(Continued)

OTHER PUBLICATIONS

Advisory Action for U.S. Appl. No. 14/304,035, dated Nov. 30, 2016, 3 pages.
(Continued)

*Primary Examiner* — Daniel Cavallari
(74) *Attorney, Agent, or Firm* — Withrow & Terranova, PLLC

(57) ABSTRACT

A computer system at a substation of an electrical grid examines on-grid communication channels and for very channel, the system compares and correlates a GLA signal provided by a downstream transmitter on that channel to a reference GLA signal. The channel that provided the signal with the best correlation is mostly likely the channel with the transmitter. Thus, the feeder and phase of the signal can be determined from the correlation of signals.

14 Claims, 9 Drawing Sheets

Related U.S. Application Data

(60) Provisional application No. 62/072,891, filed on Oct. 30, 2014.

(52) U.S. Cl.
CPC ......... *Y02B 90/2607* (2013.01); *Y02E 60/723* (2013.01); *Y02E 60/7807* (2013.01); *Y04S 10/16* (2013.01); *Y04S 40/12* (2013.01)

(56) References Cited

U.S. PATENT DOCUMENTS

| | | |
|---|---|---|
| 4,668,934 A | 5/1987 | Shuey |
| 4,918,422 A | 4/1990 | Mak |
| 5,463,624 A | 10/1995 | Hogg et al. |
| 5,812,557 A | 9/1998 | Stewart et al. |
| 6,212,560 B1 | 4/2001 | Fairchild |
| 6,366,062 B2 | 4/2002 | Baretich et al. |
| 6,373,399 B1 | 4/2002 | Johnson et al. |
| 6,650,249 B2 | 11/2003 | Meyer et al. |
| 6,690,655 B1 | 2/2004 | Miner et al. |
| 6,788,702 B1 | 9/2004 | Garcia-Luna-Aceves et al. |
| 6,961,641 B1 | 11/2005 | Forth et al. |
| 7,069,117 B2 | 6/2006 | Wilson et al. |
| 7,076,378 B1 | 7/2006 | Huebner |
| 7,188,003 B2 | 3/2007 | Ransom et al. |
| 7,194,528 B1 | 3/2007 | Davidow |
| 7,236,765 B2 | 6/2007 | Bonicatto et al. |
| 7,280,931 B1 | 10/2007 | Kim et al. |
| 7,369,579 B2 | 5/2008 | Logvinov et al. |
| 7,571,028 B2 | 8/2009 | Lapinski et al. |
| 7,598,844 B2 | 10/2009 | Corcoran et al. |
| 7,701,330 B2 | 4/2010 | Iwamura |
| 7,808,128 B1 | 10/2010 | Weber, Jr. et al. |
| 7,870,600 B2 | 1/2011 | Huotari et al. |
| 7,873,077 B2 | 1/2011 | Downey et al. |
| 7,948,255 B2 | 5/2011 | Shim et al. |
| 8,013,570 B2 | 9/2011 | Baxter et al. |
| 8,207,726 B2 | 6/2012 | Vaswani et al. |
| 8,519,832 B2 | 8/2013 | Loporto et al. |
| 8,639,922 B2 | 1/2014 | Phatak |
| 8,639,992 B2 | 1/2014 | Haufe et al. |
| 8,711,995 B2 | 4/2014 | Glende |
| 8,737,555 B2 | 5/2014 | Haug et al. |
| 8,818,742 B2 | 8/2014 | Ansari |
| 8,872,667 B2 | 10/2014 | Bhageria et al. |
| 9,059,842 B2 | 6/2015 | Bernheim et al. |
| 9,287,933 B2 | 3/2016 | Yu |
| 9,380,545 B2 | 6/2016 | Martin et al. |
| 9,438,312 B2 | 9/2016 | Bernheim et al. |
| 9,654,287 B2 | 5/2017 | Zhao et al. |
| 2001/0018561 A1 | 8/2001 | Tanida |
| 2001/0037378 A1 | 11/2001 | Hirayama |
| 2002/0069299 A1 | 6/2002 | Rosener et al. |
| 2002/0089927 A1 | 7/2002 | Fischer et al. |
| 2003/0098671 A1 | 5/2003 | Hochgraf |
| 2004/0062267 A1 | 4/2004 | Minami et al. |
| 2004/0110044 A1 | 6/2004 | McArthur et al. |
| 2004/0218688 A1 | 11/2004 | Santhoff et al. |
| 2004/0226621 A1 | 11/2004 | Phillips et al. |
| 2004/0227621 A1 | 11/2004 | Cope et al. |
| 2005/0005150 A1 | 1/2005 | Ballard |
| 2005/0017848 A1 | 1/2005 | Flen et al. |
| 2005/0043860 A1 | 2/2005 | Petite |
| 2005/0063422 A1 | 3/2005 | Lazar et al. |
| 2005/0144437 A1 | 6/2005 | Ransom et al. |
| 2005/0207079 A1 | 9/2005 | Tiller et al. |
| 2006/0071757 A1 | 4/2006 | Burghard et al. |
| 2006/0091877 A1 | 5/2006 | Robinson et al. |
| 2006/0152344 A1 | 7/2006 | Mowery, Jr. |
| 2006/0291575 A1 | 12/2006 | Berkman et al. |
| 2007/0076650 A1 | 4/2007 | Manjeshwar et al. |
| 2007/0100506 A1 | 5/2007 | Teichmann |
| 2007/0101438 A1 | 5/2007 | Govindarajan |
| 2007/0114987 A1 | 5/2007 | Kagan |
| 2007/0162550 A1 | 7/2007 | Rosenberg |
| 2007/0208521 A1 | 9/2007 | Petite et al. |
| 2007/0211401 A1 | 9/2007 | Mak |
| 2007/0237181 A1 | 10/2007 | Cho et al. |
| 2007/0247331 A1 | 10/2007 | Angelis et al. |
| 2007/0271383 A1 | 11/2007 | Kim et al. |
| 2007/0297425 A1 | 12/2007 | Chirco |
| 2008/0040479 A1 | 2/2008 | Bridge et al. |
| 2008/0109387 A1 | 5/2008 | Deaver et al. |
| 2008/0209481 A1 | 8/2008 | Barrett |
| 2008/0273521 A1 | 11/2008 | Shao et al. |
| 2008/0312851 A1 | 12/2008 | Kagan et al. |
| 2009/0027061 A1 | 1/2009 | Curt et al. |
| 2009/0088907 A1 | 4/2009 | Lewis et al. |
| 2009/0096416 A1 | 4/2009 | Tonewaga et al. |
| 2009/0125351 A1 | 5/2009 | Davis, Jr. et al. |
| 2009/0134699 A1 | 5/2009 | Choi et al. |
| 2009/0210197 A1 | 8/2009 | Cleary |
| 2009/0219932 A1 | 9/2009 | Kobayashi |
| 2009/0240504 A1 | 9/2009 | Pang et al. |
| 2009/0256686 A1 | 10/2009 | Abbot et al. |
| 2009/0304101 A1 | 12/2009 | LoPorto et al. |
| 2010/0005273 A1 | 1/2010 | Lee et al. |
| 2010/0007219 A1 | 1/2010 | de Buda et al. |
| 2010/0007336 A1 | 1/2010 | de Buda |
| 2010/0010857 A1 | 1/2010 | Fadell |
| 2010/0054349 A1 | 3/2010 | Spencer |
| 2010/0134089 A1 | 6/2010 | Uram et al. |
| 2010/0141392 A1 | 6/2010 | Jo et al. |
| 2010/0188260 A1 | 7/2010 | Cornwall et al. |
| 2010/0217549 A1 | 8/2010 | Galvin et al. |
| 2010/0217550 A1 | 8/2010 | Crabtree et al. |
| 2010/0262313 A1 | 10/2010 | Chambers et al. |
| 2010/0262393 A1 | 10/2010 | Sharma et al. |
| 2010/0286840 A1 | 11/2010 | Powell et al. |
| 2010/0296560 A1 | 11/2010 | Sadan et al. |
| 2010/0306533 A1 | 12/2010 | Phatak |
| 2011/0035073 A1 | 2/2011 | Ozog |
| 2011/0040803 A1 | 2/2011 | Pasquero et al. |
| 2011/0043340 A1 | 2/2011 | Kim et al. |
| 2011/0103429 A1 | 5/2011 | Tanaka et al. |
| 2011/0109320 A1 | 5/2011 | Curt et al. |
| 2011/0121654 A1 | 5/2011 | Recker et al. |
| 2011/0122798 A1 | 5/2011 | Hughes et al. |
| 2011/0130991 A1 | 6/2011 | Koste et al. |
| 2011/0130992 A1 | 6/2011 | Kolwalkar et al. |
| 2011/0133655 A1 | 6/2011 | Recker et al. |
| 2011/0140911 A1 | 6/2011 | Pant et al. |
| 2011/0196546 A1 | 8/2011 | Muller et al. |
| 2011/0216747 A1 | 9/2011 | Shao et al. |
| 2011/0224935 A1 | 9/2011 | Hampel et al. |
| 2011/0267202 A1 | 11/2011 | Efthymiou et al. |
| 2011/0282508 A1 | 11/2011 | Goutard et al. |
| 2011/0285382 A1 | 11/2011 | Kolwalkar et al. |
| 2012/0036250 A1 | 2/2012 | Vaswani et al. |
| 2012/0041696 A1 | 2/2012 | Sanderford, Jr. et al. |
| 2012/0052870 A1 | 3/2012 | Habicher |
| 2012/0062210 A1 | 3/2012 | Veillette |
| 2012/0062390 A1 | 3/2012 | Solomon |
| 2012/0068784 A1 | 3/2012 | Varadarajan et al. |
| 2012/0075099 A1 | 3/2012 | Brown |
| 2012/0137126 A1 | 5/2012 | Matsuoka et al. |
| 2012/0139554 A1 | 6/2012 | Parsons |
| 2012/0155557 A1 | 6/2012 | Bush et al. |
| 2012/0158329 A1 | 6/2012 | Hurri et al. |
| 2012/0185838 A1 | 7/2012 | Schwartzman et al. |
| 2012/0195355 A1 | 8/2012 | El-Essawy et al. |
| 2012/0201145 A1 | 8/2012 | Ree et al. |
| 2012/0201155 A1 | 8/2012 | Du et al. |
| 2012/0232915 A1 | 9/2012 | Bromberger |
| 2012/0242499 A1 | 9/2012 | Ree |
| 2012/0245869 A1 | 9/2012 | Ansari |
| 2012/0250864 A1 | 10/2012 | Nishibayashi et al. |
| 2012/0262355 A1 | 10/2012 | He et al. |
| 2012/0265355 A1 | 10/2012 | Bernheim et al. |
| 2012/0266209 A1 | 10/2012 | Gooding et al. |
| 2012/0275526 A1 | 11/2012 | Hughes |
| 2012/0310424 A1 | 12/2012 | Taft |
| 2012/0310558 A1 | 12/2012 | Taft |

(56) References Cited

U.S. PATENT DOCUMENTS

| | | |
|---|---|---|
| 2012/0313620 A1 | 12/2012 | Swarztrauber et al. |
| 2012/0314782 A1 | 12/2012 | Boivin et al. |
| 2012/0314868 A1 | 12/2012 | Bernheim et al. |
| 2012/0316696 A1 | 12/2012 | Boardman et al. |
| 2012/0323388 A1 | 12/2012 | Littrell et al. |
| 2013/0013232 A1 | 1/2013 | Parwal et al. |
| 2013/0031201 A1 | 1/2013 | Kagan et al. |
| 2013/0034086 A1 | 2/2013 | Martin et al. |
| 2013/0067253 A1 | 3/2013 | Tsuda |
| 2013/0121157 A1 | 5/2013 | Logvinov et al. |
| 2013/0132555 A1 | 5/2013 | Wang et al. |
| 2013/0151177 A1 | 6/2013 | Hughes |
| 2013/0193767 A1 | 8/2013 | Carralero et al. |
| 2013/0194975 A1 | 8/2013 | Vedantham et al. |
| 2013/0204450 A1 | 8/2013 | Kagan et al. |
| 2013/0257452 A1 | 10/2013 | DeLeo et al. |
| 2014/0035372 A1 | 2/2014 | Normoyle et al. |
| 2014/0062719 A1 | 3/2014 | Rowitch |
| 2014/0105313 A1 | 4/2014 | Kim et al. |
| 2014/0118163 A1 | 5/2014 | Li et al. |
| 2014/0125125 A1 | 5/2014 | Wyatt |
| 2014/0140358 A1 | 5/2014 | Kim et al. |
| 2014/0167735 A1 | 6/2014 | Beroset |
| 2014/0172723 A1 | 6/2014 | Borisov et al. |
| 2014/0191568 A1 | 7/2014 | Partovi |
| 2014/0233620 A1 | 8/2014 | Bernheim et al. |
| 2014/0233662 A1 | 8/2014 | Hansell et al. |
| 2014/0236365 A1 | 8/2014 | Martin et al. |
| 2014/0236366 A1 | 8/2014 | Livadaras et al. |
| 2014/0236506 A1 | 8/2014 | Nikovski et al. |
| 2014/0300210 A1 | 10/2014 | Abi-Ackel et al. |
| 2014/0359595 A1 | 12/2014 | Sehgal et al. |
| 2014/0361907 A1 | 12/2014 | Bernheim et al. |
| 2014/0368189 A1 | 12/2014 | Bernheim et al. |
| 2015/0010093 A1 | 1/2015 | Hansell et al. |
| 2015/0316620 A1 | 11/2015 | Luan et al. |
| 2016/0112378 A1 | 4/2016 | Bernheim et al. |
| 2016/0124421 A1 | 5/2016 | Hansell et al. |
| 2016/0127242 A1 | 5/2016 | Bernheim et al. |
| 2016/0164287 A1 | 6/2016 | Bernheim |
| 2016/0204991 A1 | 7/2016 | Martin et al. |
| 2016/0285511 A1 | 9/2016 | Hansell et al. |
| 2016/0302238 A1 | 10/2016 | Martin et al. |
| 2017/0344047 A1 | 11/2017 | Cioraca et al. |

FOREIGN PATENT DOCUMENTS

| | | |
|---|---|---|
| EP | 0629098 A2 | 12/1994 |
| EP | 1901145 A2 | 3/2008 |
| EP | 233043 A1 | 6/2011 |
| EP | 2566125 A1 | 3/2013 |
| JP | H09501766 A | 2/1997 |
| JP | 2003259696 A | 9/2003 |
| JP | 2003339120 A | 11/2003 |
| JP | 2004015840 A | 1/2004 |
| JP | 2004147063 A | 5/2004 |
| JP | 2005252671 A | 9/2005 |
| JP | 2006262570 A | 9/2006 |
| JP | 2007185083 A | 7/2007 |
| JP | 2008508781 A1 | 3/2008 |
| JP | 2008098812 A | 4/2008 |
| JP | 2008124859 A | 5/2008 |
| JP | 2010156694 A | 7/2010 |
| JP | 2010161923 A | 7/2010 |
| JP | 2010533843 A | 10/2010 |
| JP | 2010268121 A | 11/2010 |
| JP | 2011525787 A | 9/2011 |
| JP | 2012227928 A | 11/2012 |
| JP | 2013005718 A1 | 1/2013 |
| JP | 2013106255 A | 5/2013 |
| WO | 9501030 A1 | 1/1995 |
| WO | 9806187 A1 | 2/1998 |
| WO | 2009067250 A1 | 5/2009 |
| WO | 2010027421 A2 | 3/2010 |
| WO | 2010141859 A1 | 12/2010 |
| WO | 2013006273 A2 | 1/2013 |
| WO | 2013013162 A2 | 1/2013 |
| WO | 2014006662 A1 | 1/2014 |
| WO | 2014096911 A2 | 6/2014 |
| WO | WO 2014096911 A1 * | 6/2014 ............... H04B 3/54 |

OTHER PUBLICATIONS

Final Office Action for U.S. Appl. No. 14/304,648, dated Mar. 9, 2017, 7 pages.
Non-Final Office Action for U.S. Appl. No. 15/184,642, dated Mar. 9, 2017, 5 pages.
Office Action No. 11851, Colombian Patent Application No. 15-222367, dated Mar. 17, 2017, 19 pages.
First Office Action for Chinese Patent Application No. 201480032631.X, dated Feb. 27, 2017, 5 pages.
First Office Action for Chinese Patent Application No. 201480034010.5, dated Feb. 17, 2017, 7 pages.
Yan, Ping et al., "Study of Linear Models in Steady State Load Flow Analysis of Power Systems," IEEE Power Engineering Society Winter Meeting, vol. 1, Jan. 27-31, 2002, New York, NY, IEEE, pp. 666-671.
Translated Summary of Office Action No. 4963 for Columbian Patent Application No. 15-222371, dated Apr. 5, 2017, 3 pages.
International Preliminary Report on Patentability for International Patent Application No. PCT/US2015/058423, dated May 11, 2017, 8 pages.
International Preliminary Report on Patentability for International Patent Application No. PCT/US2015/058492, dated May 11, 2017, 10 pages.
Non-Final Office Action for U.S. Appl. No. 14/304,035, dated May 17, 2017, 22 pages.
Final Office Action for U.S. Appl. No. 14/304,648, dated May 19, 2017, 7 pages.
Advisory Action for U.S. Appl. No. 14/304,648, dated May 24, 2017, 3 pages.
Non-Final Office Action for U.S. Appl. No. 14/928,783, dated May 8, 2017, 16 pages.
Examination Report No. 1 for Australian Patent Application No. 2014219247, dated Apr. 26, 2017, 4 pages.
Second Office Action for Chilean Patent Application No. 2323-2015, dated May 17, 2017, 14 pages.
Second Office Action for Chilean Patent Application No. 2322-2015, dated May 17, 2017, 13 pages.
First Office Action for Chinese Patent Application No. 201480009549.5, dated May 31, 2017, 9 pages.
Examination Report No. 1 for Australian Patent Application No. 2014277951, dated Jun. 8, 2017, 4 pages.
Office Action Summary for Columbian Patent Application No. 7058, dated Jun. 16, 2017, 2 pages.
International Preliminary Report on Patentability for International Patent Application No. PCT/US2015/063752, dated Jun. 15, 2017, 12 pages.
Non-Final Office Action for U.S. Appl. No. 13/871,944, dated Jun. 15, 2017, 14 pages.
First Office Action for Chinese Patent Application No. 201480009551.2, dated Jun. 19, 2017, 9 pages.
Extended European Search Report for European Patent Application No. 17173049.2, dated Aug. 11, 2017, 8 pages.
Examination report No. 1 for Australian Patent Application No. 2014277983, dated Jun. 16, 2017, 4 pages.
Non-Final Office Action for U.S. Appl. No. 13/896,029, dated Jul. 20, 2017, 17 pages.
Advisory Action for U.S. Appl. No. 14/304,648, dated Aug. 17, 2017, 3 pages.
Notice of Allowance for U.S. Appl. No. 15/184,642, dated Jul. 13, 2017, 8 pages.
Notice of Allowance for U.S. Appl. No. 15/184,642, dated Jul. 27, 2017, 4 pages.
Notice of Allowance for U.S. Appl. No. 14/929,087, dated Aug. 15, 2017, 9 pages.

(56) References Cited

OTHER PUBLICATIONS

Second Office Action for Chinese Patent Application No. 201480032631.X, dated Sep. 4, 2017, 5 pages.
Second Office Action for Chinese Patent Application No. 201480034010.5, dated Aug. 2, 2017, 5 pages.
Final Office Action for U.S. Appl. No. 14/304,035, dated Oct. 5, 2017, 16 pages.
Notice of Allowance for U.S. Appl. No. 14/928,783, dated Nov. 6, 2017, 9 pages.
Advisory Action for U.S. Appl. No. 14/304,035, dated Dec. 29, 2017, 3 pages.
Office Action for Colombian Patent Application No. 15222371, dated Oct. 15, 2017, 9 pages.
First Office Action for Chinese Patent Application No. 201480034011.X, dated Oct. 30, 2017, 16 pages.
Notice of Acceptance for Australian Patent Application No. 2014219246, dated Dec. 5, 2017, 3 pages.
Office Action for Mexican Patent Application No. MX/a/2015/017231, dated Oct. 20, 2017, 13 pages.
Non-Final Office Action for U.S. Appl. No. 15/177,930, dated Mar. 3, 2017, 6 pages.
Non-Final Office Action for U.S. Appl. No. 15/177,930, dated Nov. 1, 2017, 14 pages.
International Telecommunications Union, "ITU-T G.9960, Series G: Transmission Systems and Media, Digital Systems and Networks," Dec. 1, 2011, 160 pages.
International Telecommunications Union, "Updated draft text for ITU-T G.9961, Series G: Transmission Systems and Media, Digital Systems and Networks—Amendment 1 Corrigendum 1," ITU-T: Telecommunication Standardization Sector, Study Group 15, Amendment approved Sep. 21, 2012, 82 pages.
International Telecommunications Union, "ITU-T G.9961, Series G: Transmission Systems and Media, Digital Systems and Networks," Apr. 1, 2014, 306 pages.
First Office Action for Chinese Patent Application No. 201480009550.8, dated Jan. 26, 2018, 4 pages.
Decision to Grant a Patent for Japanese Patent Application No. 2015-558888, dated Jan. 30, 2018, 4 pages.
Notice of Reasons for Rejection for Japanese Patent Application No. 2015-558889, dated Jan. 23, 2018, 7 pages.
Extended European Search Report for European Patent Application No. 17203296.3, dated Feb. 15, 2018, 8 pages.
Second Office Action for Chinese Patent Application No. 201480009549.5, dated Jan. 23, 2018, 4 pages.
Notice of Reasons for Rejection for Japanese Patent Application No. 2015-558887, dated Jan. 23, 2018, 7 pages.
Notice of Reasons for Rejection for Japanese Patent Application No. 2016-518052, dated Feb. 20, 2018, 8 pages.
Third Office Action for Chinese Patent Application No. 201480034010.5, dated Jan. 17, 2018, 4 pages.
Notice of Reasons for Rejection for Japanese Patent Application No. 2016-519694, dated Feb. 27, 2018, 11 pages.
First Examination Report for Indian Patent Application No. 13/CHENP/2011, dated Jan. 11, 2018, 6 pages.
Office Action for Canadian Patent Application No. 2,870,452, dated Dec. 28, 2017, 4 pages.
Office Action for Canadian Patent Application No. 2,874,132, dated Jan. 25, 2018, 3 pages.
Extended European Search Report for European Patent Application No. 15853935.3, dated Feb. 15, 2018, 10 pages.
Extended European Search Report for European Patent Application No. 15855864.3, dated Feb. 21, 2018, 9 pages.
Final Office Action for U.S. Appl. No. 13/896,029, dated Jan. 24, 2018, 22 pages.
Notice of Allowance for U.S. Appl. No. 13/871,944, dated Feb. 23, 2018, 18 pages.
Notice of Allowance for U.S. Appl. No. 14/304,035, dated Feb. 7, 2018, 9 pages.
Corrected Notice of Allowance for U.S. Appl. No. 14/928,783, dated Jan. 23, 2018, 6 pages.
Corrected Notice of Allowance for U.S. Appl. No. 14/928,783, dated Feb. 15, 2018, 6 pages.
Non-Final Office Action for U.S. Appl. No. 14/958,385, dated Jan. 12, 2018, 33 pages.
Author Unknown, "MicroPlanet® Voltage Regulators," EnergyIdeas Clearinghouse PTR #6.4, Product and Technology Review, Jun. 2008, 6 pages, http://www.energyideas.org/documents/factsheets/PTR/Microplanet.pdf.
Author Unknown, "Prime Alliance Official Website," Web, Date Accessed: Nov. 4, 2015, 3 pages, http://www.prime-alliance.org/.
Author Unknown, "The G3 PLC Alliance Unveils its Interoperability process," The G3-PLC Alliance, Oct. 8, 2012, Paris, France, http://www.g3-plc.com/content/press-releases, p. 1.
Author Unknown, "TWACS Low Frequency Power Line Communication Signals Problematic to Public Health," dated May 3, 2013, 20 pages, http://www.eiwellspring.org/smartmeter/TWACS.pdf.
Author Unknown, "Universal Powerline Bus Communication Technology Overview," Powerline Control Services, Jan. 8, 2002, 13 pages, http://pulseworx.com/downloads/upb/UpbOverview.pdf.
Baggini, Angelo "Handbook of Power Quality" John Wiley & Sons, Ltd., 2008, 65 pages.
Bates, Michael, "CVR has Potential Beyond Pushing Efficiencies on Feeders." renewGRID, Mar. 26, 2012, 2 pages, http://www.renew-grid.com/e107plugins/contenl/contenl.php?contenl.8215.
Bresesti, Paola et al., "SDNO: Smart Distribution Network Operation Project", Power Engineering Society General Meeting, IEEE, 2007, 4 pages.
Choi, Moonsuk et al., "Design of Integrated Meter Reading System based on Power-Line Communication", Power Line Communications and Its Applications, IEEE, International Symposium, 2008, pp. 280-284.
Collins, Dermot et al., "Transmission on Power Line Cables," Telektronikk, vol. 95, No. 2/3, 1999, pp. 134-137.
Dilek, M., "Integrated Design of Electrical Distribution Systems: Phase Balancing and Phase Prediction Case Studies," Dissertation, 2001, 150 pages, http://scholar.lib.vt.edu/theses/available/etd-11132001-222401/.
Goh, Chong Hock K., "A Current Study of Automatic Meter Reading Solutions via Power Line Communications," 19 pages, http://wpweb2k.gsia.cmu.edu/ceic/publicatons.htm. (Published 2003 or later as evidenced by the bibliography).
Ha, K. A., "Power Line Communication Technology," Presentation at Hong Kong Institute of Engineers Seminar on Last Mile Technology, Jun. 20, 2003, 24 pages.
Hooijen, Olaf G. "A Channel Model for the Residential Power Circuit Used as a Digital Communications Medium," IEEE Transactions on Electromagnetic Compatibility, vol. 40, No. 4, Nov. 1998, pp. 331-336.
McGhee, Jim et al., "Smart High Voltage Substation based on IEC 61850 Process Bus and IEEE 1588 Time Synchronization" 2010 First IEEE International Conference on Smart Grid Communications, IEEE, Oct. 4-6, 2010, pp. 489-494.
Mitchell, Travis, "Dominion Conservation Voltage Reduction software reduces energy use by 2.8%," Fierce Energy Daily, Sep. 27, 2011, 3 pages, http://www.fierceenergy.com/story/dominion-conservation-voltage-reduction-software-reduces-energy-use-28/2011-09-27.
Montoya, Luis F.,"Power Line Communications Performance Overview of the Physical Layer of Available Protocols," Thesis of Research, University of Florida, Gainesville, Florida, Date Unknown, pp. 1-15.
Moreno-Munoz A., et al., "Integrating Power Quality to Automated Meter Reading", IEEE Industrial Electronics Magazine, IEEE, US, vol. 2, No. 2, Jun. 17, 2008, pp. 10-18.
Newbury, John, "Efficient Communication Services Using the Low Voltage Distribution Line," Proceedings of 2002 PES Winter Meeting, IEEE, 2002, pp. 579-591.
Nyack, Cuthbert A., "Convolution and Autocorrelation," Web, Date Accessed: Nov. 4, 2015, 3 pages, http://cnyack.homestead.com/files/aconv/convau1.htm.
Pallares-Lopez et al., "Embedding synchronism in SmartGrid with IEEE1588-based for Intelligent Electronics," 2010 First IEEE Inter-

(56) References Cited

OTHER PUBLICATIONS national Conference on Smart Grid Communications, published/presented Oct. 4-6, 2010, Gaithersburg, Maryland, 7 pages.
Pavlidou, Niovi et al., "Power Line Communications: State of the Art and Future Trends," IEEE Communications Magazine, IEEE, vol. 41, No. 4, Apr. 2003, pp. 34-40.
Rye, Dave, "The X-10 Powerhouse Power Line Interface Model #PL513 and Two-Way Power Line Interface Model #TW523," X-10 Inc., X-10.RTM. POWERHOUSE (TM) Technical Note, Revision 2.4, 1991, 12 pages.
Schickhuber, Gerald et al., "Control Using Power Lines—a European View," Computing & Control Engineering Journal, vol. 8, No. 4, Aug. 1997, pp. 180-184.
Sherman et al, "Location Authentication through Power Line Communication: Design, Protocol, and Analysis of a New Out of Band Strategy," Cyber Defense Lab, Department of CSEE, University of Maryland, Baltimore County, IEEE, 2010, pp. 279-284.
Van Rensburg, Petrus A. Hanse et al., "Design of a Bidirectional Impedance-Adapting Transformer Coupling Circuit for Low-Voltage Power-Line Communications," IEEE Transactions on Power Delivery, IEEE, vol. 20, No. 1, Jan. 2005, pp. 64-70.
International Search Report for International Patent Application No. PCT/US2014/016538, dated Jun. 16, 2014, 3 pages.
International Preliminary Report on Patentability for PCT/US2014/016538, dated Sep. 3, 2015, 10 pages.
International Search Report for PCT/US2014/016540, dated Jun. 17, 2014, 3 pages.
International Preliminary Report on Patentability for PCT/US2014/016540, dated Sep. 3, 2015, 9 pages.
International Search Report for PCT/US2014/016535, dated Jun. 3, 2014, 2 pages.
International Preliminary Report on Patentability for PCT/US2014/016535, dated Sep. 3, 2015, 8 pages.
International Search Report and Written Opinion for PCT/US2014/041396, dated Oct. 29, 2014, 12 pages.
International Search Report and Written Opinion for PCT/US2014/042300, dated Oct. 20, 2014, 16 pages.
International Search Report and Written Opinion for PCT/US2014/042393, dated Oct. 20, 2014, 15 pages.
International Search Report for PCT/US2009/046644, dated Mar. 2, 2010, 7 pages.
International Preliminary Report on Patentability for PCT/US2009/046644, dated Dec. 6, 2010, 10 pages.
International Search Report for PCT/US2012/033789, dated Sep. 6, 2012, 4 pages.
International Search Report for PCT/US2012/041971, dated Dec. 7, 2012, 5 pages.
International Search Report for PCT/US2012/049524, dated Jan. 3, 2013, 3 pages.
Non-Final Office Action for U.S. Appl. No. 13/566,481, dated Aug. 7, 2015, 27 pages.
Non-Final Office Action for U.S. Appl. No. 13/493,983, dated Feb. 5, 2014, 11 pages.
Final Office Action for U.S. Appl. No. 13/493,983, dated Oct. 31, 2014, 12 pages.
Non-Final Office Action for U.S. Appl. No. 13/448,005, dated Sep. 11, 2014, 20 pages.
Non-Final Office Action for U.S. Appl. No. 13/448,005, dated Apr. 15, 2015, 22 pages.
Non-Final Office Action for U.S. Appl. No. 12/480,493, dated Jul. 16, 2012, 24 pages.
Notice of Allowance and Examiner-Initiated Interview Summary for U.S. Appl. No. 12/480,493, dated Jun. 20, 2013, 13 pages.
Non-Final Office Action for U.S. Appl. No. 13/896,029, dated Sep. 18, 2015, 16 pages.
Non-Final Office Action for U.S. Appl. No. 13/871,944, dated Oct. 16, 2015, 13 pages.
Non-Final Office Action for U.S. Appl. No. 13/888,102, dated Jul. 9, 2015, 18 pages.
Search Report for Japanese Patent Application No. 2011-512749, search date Aug. 14, 2013, 29 pages.
Office Action for Japanese Patent Application No. 2011-512749, drafting date Sep. 4, 2013, 7 pages.
International Preliminary Report on Patentability for PCT/US2014/041396, dated Dec. 17, 2015, 8 pages.
International Preliminary Report on Patentability for PCT/US2014/042300, dated Dec. 23, 2015, 9 pages.
International Preliminary Report on Patentability for PCT/US2014/042393, dated Dec. 23, 2015, 11 pages.
Office Action for Canadian Patent Application No. 2,727,034, dated Nov. 26, 2015, 4 pages.
Decision of Final Rejection for Japanese Patent Application No. 2014-119504, dated Nov. 10, 2015, 5 pages.
Translation of Decision to Grant for Japanese Patent Application No. 2014-119505, dated Dec. 15, 2015, 3 pages.
Office Action for Cuban Patent Application No. 2015-0088, dated Oct. 30, 2015, 3 pages.
Final Office Action for U.S. Appl. No. 13/888,102, dated Dec. 24, 2015, 18 pages.
Non-Final Office Action for U.S. Appl. No. 13/911,849, dated Nov. 24, 2015, 15 pages.
Sendin, Alberto, et al., "Enhanced Operation of Electricity Distribution Grids Through Smart Metering PLC Network Monitoring, Analysis and Grid Conditioning," Energies, vol. 6, Issue 1, Jan. 21, 2013, www.mdpi.com/journal/energies, pp. 539-556.
Colson, C.M., "Algorithms for Distributed Decision-Making for Multi-agent Microgrid Power Management," IEEE Power and Energy Society General Meeting, Jul. 24-29, 2011, San Diego, California, IEEE, pp. 1-8.
Wetula, Andrzej, "A Hilbert Transform Based Algorithm for Detection of a Complex Envelope of a Power Grid Signals—an Implementation," Journal of Electrical Power Quality and Utilisation, vol. 14, Issue 2, 2008, EPQU Journal, pp. 13-18.
Partial Supplementary European Search Report for European Patent Application No. 14754343.3, dated Feb. 8, 2016, 5 pages.
Extended European Search Report for European Patent Application No. 14754343.3, dated May 24, 2016, 12 pages.
Examination Report for European Patent Application No. 09759619.1, dated May 13, 2016, 7 pages.
Notice of Allowance and Examiner Initiated Interview Summary for U.S. Appl. No. 13/911,849, dated Apr. 5, 2016, 10 pages.
Corrected Notice of Allowance for U.S. Appl. No. 13/911,849, dated May 31, 2016, 4 pages.
Non-Final Office Action for U.S. Appl. No. 14/304,035, dated Feb. 25, 2016, 22 pages.
Final Office Action for U.S. Appl. No. 13/448,005, dated Jun. 6, 2016, 11 pages.
Non-Final Office Action for U.S. Appl. No. 14/720,780, dated Feb. 26, 2016, 7 pages.
Notice of Allowance for U.S. Appl. No. 13/566,481, dated Feb. 26, 2016, 7 pages.
International Search Report and Written Opinion for International Patent Application No. PCT/US2015/058423, dated Jan. 19, 2016, 12 pages.
International Search Report and Written Opinion for International Patent Application No. PCT/US2015/058492, dated Feb. 26, 2016, 18 pages.
International Search Report and Written Opinion for International Patent Application No. PCT/US2015/063752, dated Mar. 24, 2016, 16 pages.
International Preliminary Report on Patentability for International Patent Application No. PCT/US2012/33789, dated Oct. 24, 2013, 10 pages.
International Preliminary Report on Patentability for International Patent Application No. PCT/US2012/041971, dated Dec. 10, 2013, 6 pages.
International Preliminary Report on Patentability for International Patent Application No. PCT/US2012/049524, dated Feb. 4, 2014, 7 pages.
Final Office Action for U.S. Appl. No. 13/896,029, dated Jun. 22, 2016, 22 pages.

(56) References Cited

OTHER PUBLICATIONS

Final Office Action for U.S. Appl. No. 14/304,035, dated Aug. 26, 2016, 18 pages.
Final Office Action for U.S. Appl. No. 14/720,780, dated Sep. 1, 2016, 9 pages.
Partial Supplementary European Search Report for European Patent Application No. 14754339.1, dated Oct. 4, 2016, 6 pages.
European Search Report for European Patent Application No. 14754343.3, dated Jun. 10, 2016, 1 page.
Partial Supplementary European Search Report for European Patent Application No. 14754714.5, dated Oct. 6, 2016, 6 pages.
Non-Final Office Action for U.S. Appl. No. 13/896,029, dated Nov. 10, 2016, 18 pages.
Notice of Allowance for U.S. Appl. No. 13/871,944, dated Oct. 4, 2016, 9 pages.
Non-Final Office Action for U.S. Appl. No. 14/304,648, dated Sep. 7, 2016, 4 pages.
Notice of Allowance for U.S. Appl. No. 14/720,780, dated Nov. 4, 2016, 5 pages.
First Office Action for Chilean Patent Application No. 2325-2015, dated Jan. 26, 2017, 13 pages.
Extended European Search Report for European Patent Application No. 14754339.1, dated Jan. 16, 2017, 10 pages.
First Office Action for Chilean Patent Application No. 2323-2015, dated Jan. 26, 2017, 15 pages.
Office Action No. 13556 for Colombian Patent Application No. 15-222367, dated Nov. 28, 2016, 13 pages.
Examination Report No. 1 for Australian Patent Application No. 2014219244, dated Dec. 21, 2016, 4 pages.
First Office Action for Chilean Patent Application No. 2322-2015, dated Jan. 26, 2017, 15 pages.
Extended European Search Report for European Patent Application No. 14754714.5, dated Jan. 16, 2017, 10 pages.
Extended European Search Report for European Patent Application No. 14808081.5, dated Jan. 30, 2017, 7 pages.
Extended European Search Report for European Patent Application No. 14810273.4, dated Feb. 1, 2017, 12 pages.
Extended European Search Report for European Patent Application No. 14811042.2, dated Jan. 2, 2017, 7 pages.
Examination Report No. 1 for Australian Patent Application No. 2014219246, dated Dec. 22, 2016, 3 pages.
Extended European Search Report for European Patent Application No. 18152637.7, dated Apr. 26, 2018, 8 pages.
Notice of Acceptance for Australian Patent Application No. 2014219247, dated Apr. 11, 2018, 3 pages.
Second Examination Report for Australian Patent Application No. 2014277983, dated Mar. 15, 2018, 4 pages.
Second Official Action for Mexican Patent Application No. MX/a/2015/017231, dated Feb. 28, 2018, 5 pages.
Notice of Acceptance for Australian Patent Application No. 2014277951, dated Mar. 28, 2018, 3 pages.
Extended European Search Report for European Patent Application No. 15865305.5, dated May 3, 2018, 8 pages.
Supplemental Notice of Allowability for U.S. Appl. No. 14/304,035, dated Apr. 18, 2018, 6 pages.
Non-Final Office Action for U.S. Appl. No. 15/934,499, dated May 7, 2018, 30 pages.
Non-Final Office Action for U.S. Appl. No. 15/257,191, dated Apr. 4, 2018, 10 pages.
Non-Final Office Action for U.S. Appl. No. 15/450,153, dated Apr. 19, 2018, 10 pages.
Interview Summary for U.S. Appl. No. 14/958,385, dated Apr. 6, 2018, 3 pages.

* cited by examiner

FIG. 5

SYSTEM, METHOD, AND APPARATUS FOR GRID LOCATION

CROSS REFERENCE TO RELATED APPLICATIONS

This application is a continuation of co-pending U.S. patent application Ser. No. 14/929,087, filed on Oct. 30, 2015, entitled "SYSTEM, METHOD, AND APPARATUS FOR GRID LOCATION," which claims the benefit of U.S. Provisional Patent Application No. 62/072,891, filed on Oct. 30, 2014, the disclosures of each of which are hereby incorporated herein by reference in their entireties.

TECHNICAL FIELD

The present invention is directed to location detection, and more particularly to location detection of apparatus coupled to an electrical grid.

SUMMARY

The present invention is directed toward the use of communications from the edge of an electrical distribution grid and more specifically, towards detecting characterizing signals received from a transmitting device (hereinafter "downstream transmitters") located at the edges of the grid and/or at intermediate points between the distribution substation and the edges of the grid.

The invention discriminates a signal received from a downstream transmitter by correlating one or more received characterizing signals to a reference characterizing signal at a substation receiver. The downstream transmitter is located at the edge of the distribution grid or at any intermediate point between the distribution substation and the edge of the grid. The invention is looking for transmission during a time slot, does not know from which device the transmission is sent or if, or precisely when, to expect it. Due to cross-talk and reflections, multiple copies of the transmitted signal can be received at the substation, with these copies received on different feeders and phases. By comparing the results of the correlation across a topology of feeders and phases, the received signal having the best correlation is selected as the actual signal. This correlation approach creates the ability to drive a functionality that can discriminate upon which feeder and phase (hereinafter "feeder phase") the signal was transmitted. As the correlation can be sharp in the time domain, the invention can determine precisely when the originally transmitted signal was received at the distribution substation. By transmitting the original signal at the zero cross of the voltage of the feeder and phase at the point of origination and by comparing the time that the transmitted signal was received at the distribution substation with respect to a voltage or current reference at the substation, the topology of the distribution grid can be determined.

The invention analyzes the signals coming in from all feeders and phases of the substation, e.g., all electrical paths back to the substation, substantially simultaneously, and the invention determines, based on metrics, which received signal provides the best correlation to the reference signal. In part, the process is a peer review comparison whereby the reference signal is compared to all of the received signals and the received signal with the highest level of correlation is identified as the signal corresponding to the originating feeder phase.

The present invention is a system used to assess the topological and electrical properties of an electrical grid. This information is extracted from a stream of electrical signals resulting from an originating signal transmitted over the electrical grid and collected at a Feeder Intelligence Module (FIM) located at a distribution substation. The channel topology includes a compilation of devices through which the transmitted signal passes, and identifies additional devices related to the grid that may influence the characteristics of the signal path. Underlying the following discussion is the notion of a distribution substation's channel topology. The channel topology is essentially a hierarchical listing of the devices instrumented at the distribution substation and the devices, circuits, and other features associated with each device respectively.

BRIEF DESCRIPTION OF THE DRAWINGS

The accompanying drawings, which are incorporated in, and form part of, the specification, illustrate embodiments of the invention and, together with the description, serve to explain the principles of the invention.

For purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the substance disclosed.

Figure 1:
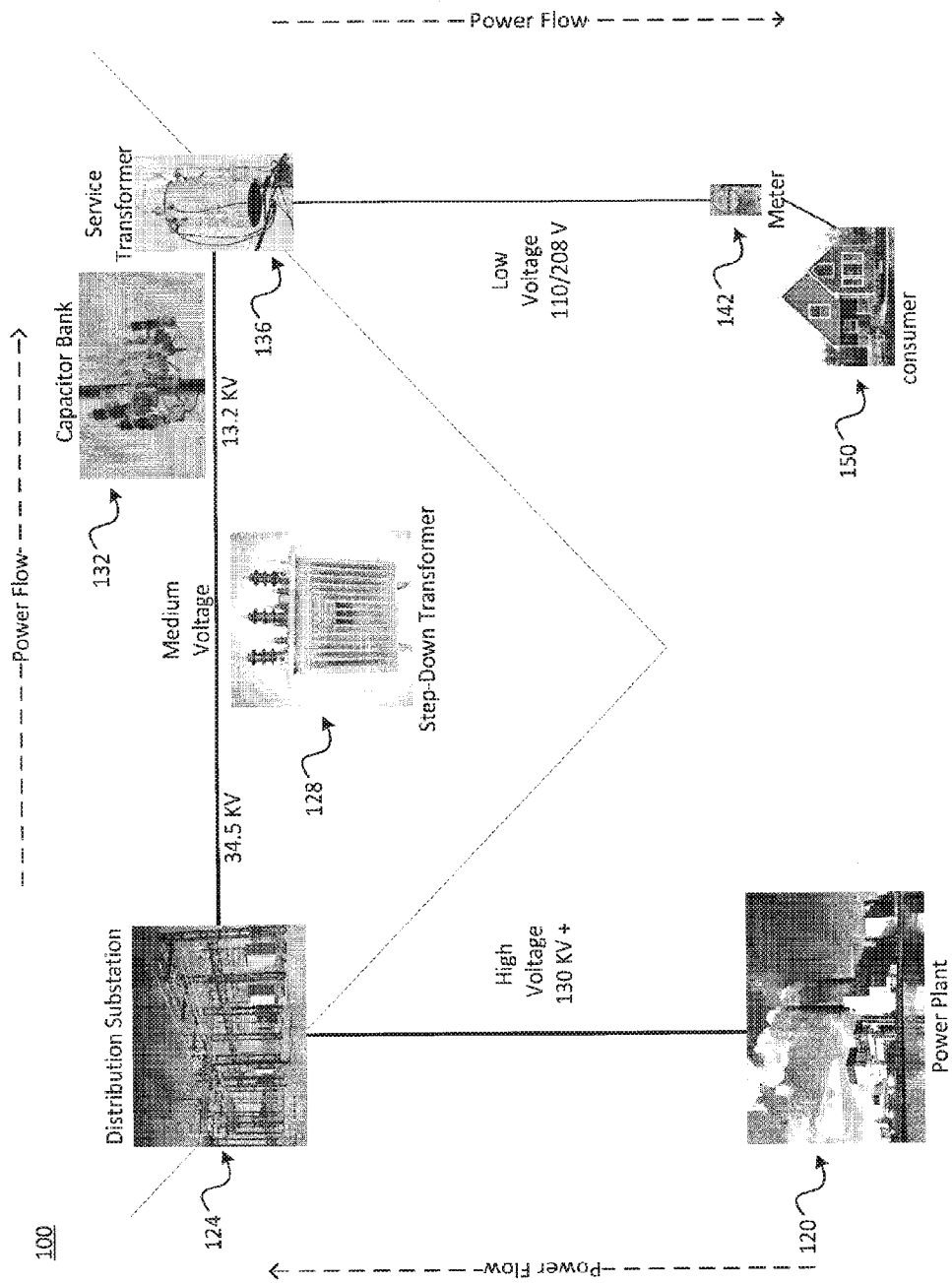

It should be noted that, while the various figures show respective aspects of the invention, no one figure is intended to show the entire invention. Rather, the figures together illustrate the invention in its various aspects and principles. As such, it should not be presumed that any particular figure is exclusively related to a discrete aspect or species of the invention. To the contrary, one of skill in the art would appreciate that the figures taken together reflect various embodiments exemplifying the invention.

Figure 2:
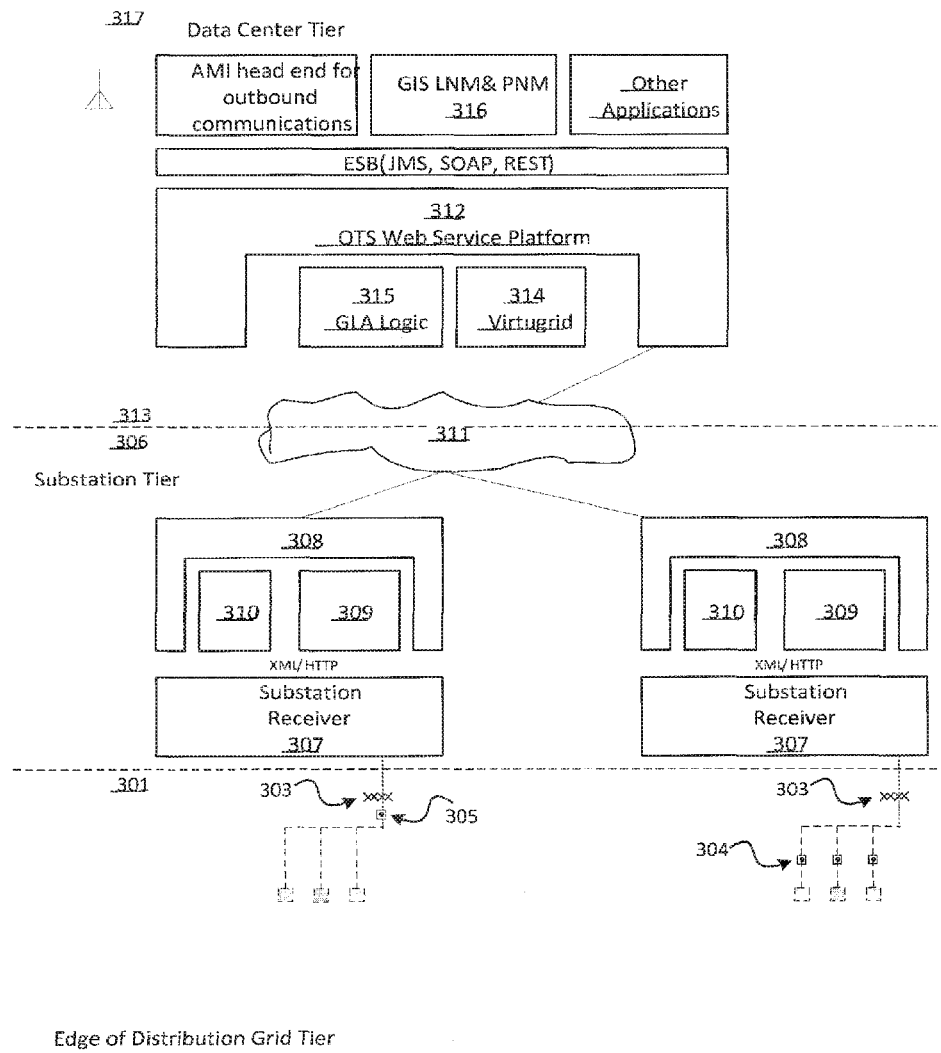
Figure 3:
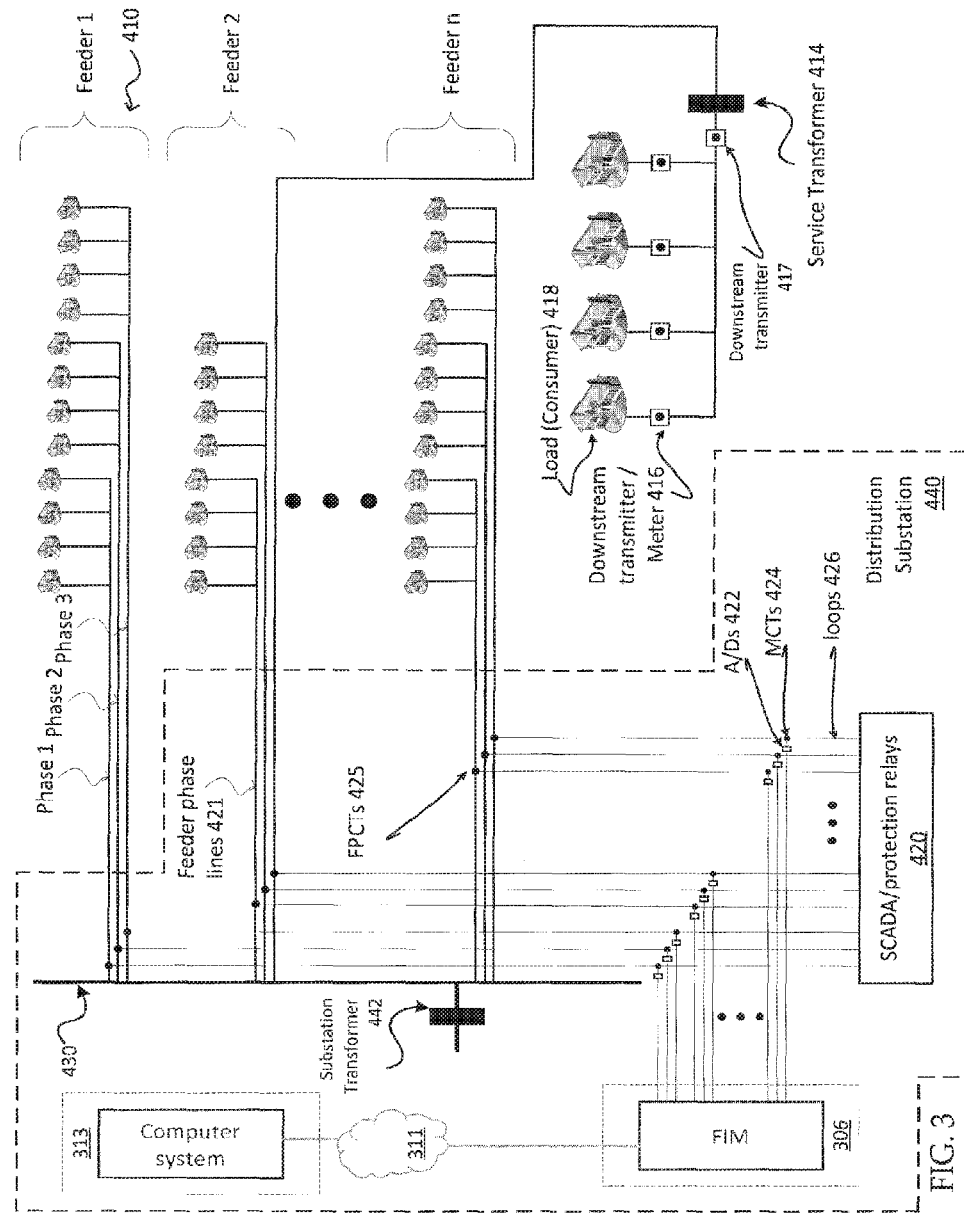
Figure 4:
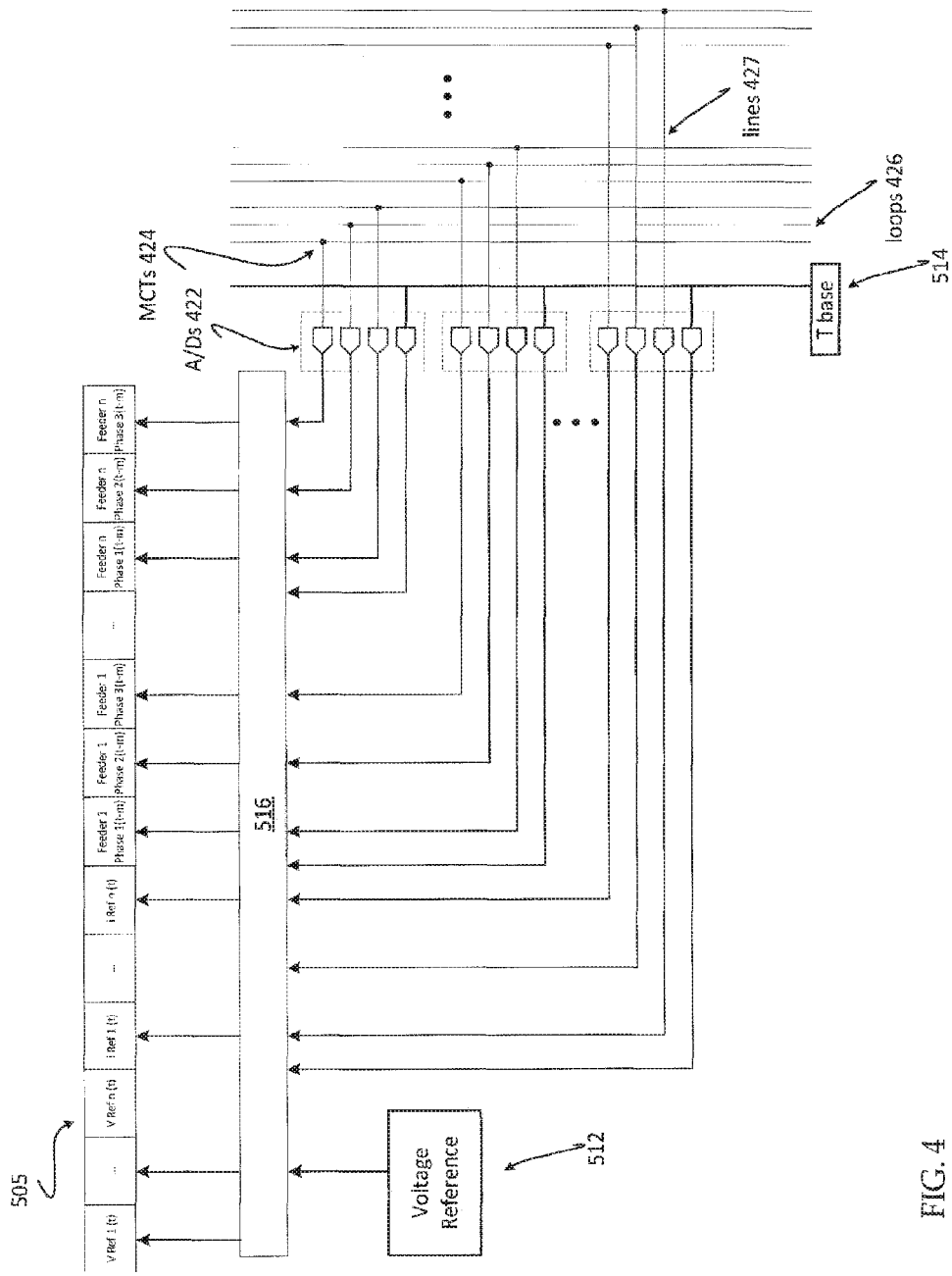
Figure 6:
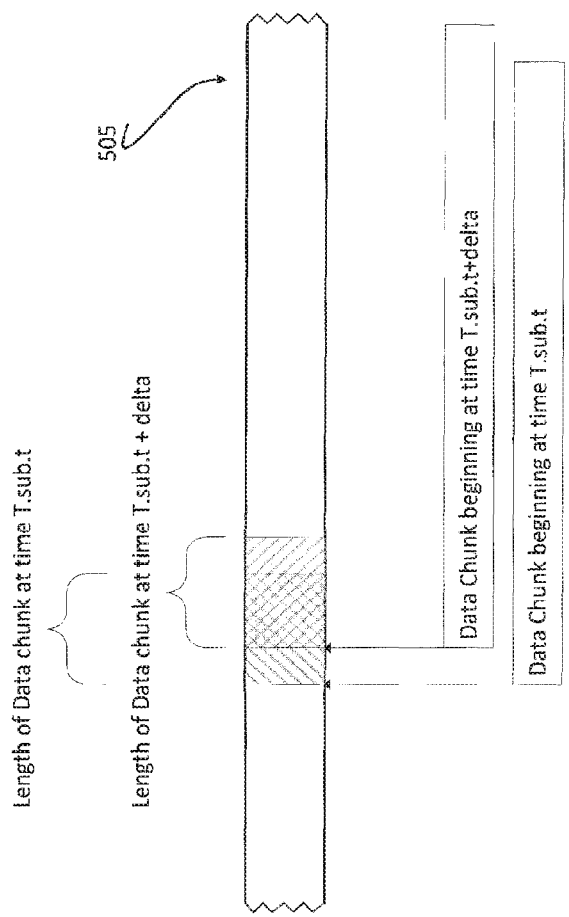
Figure 7:
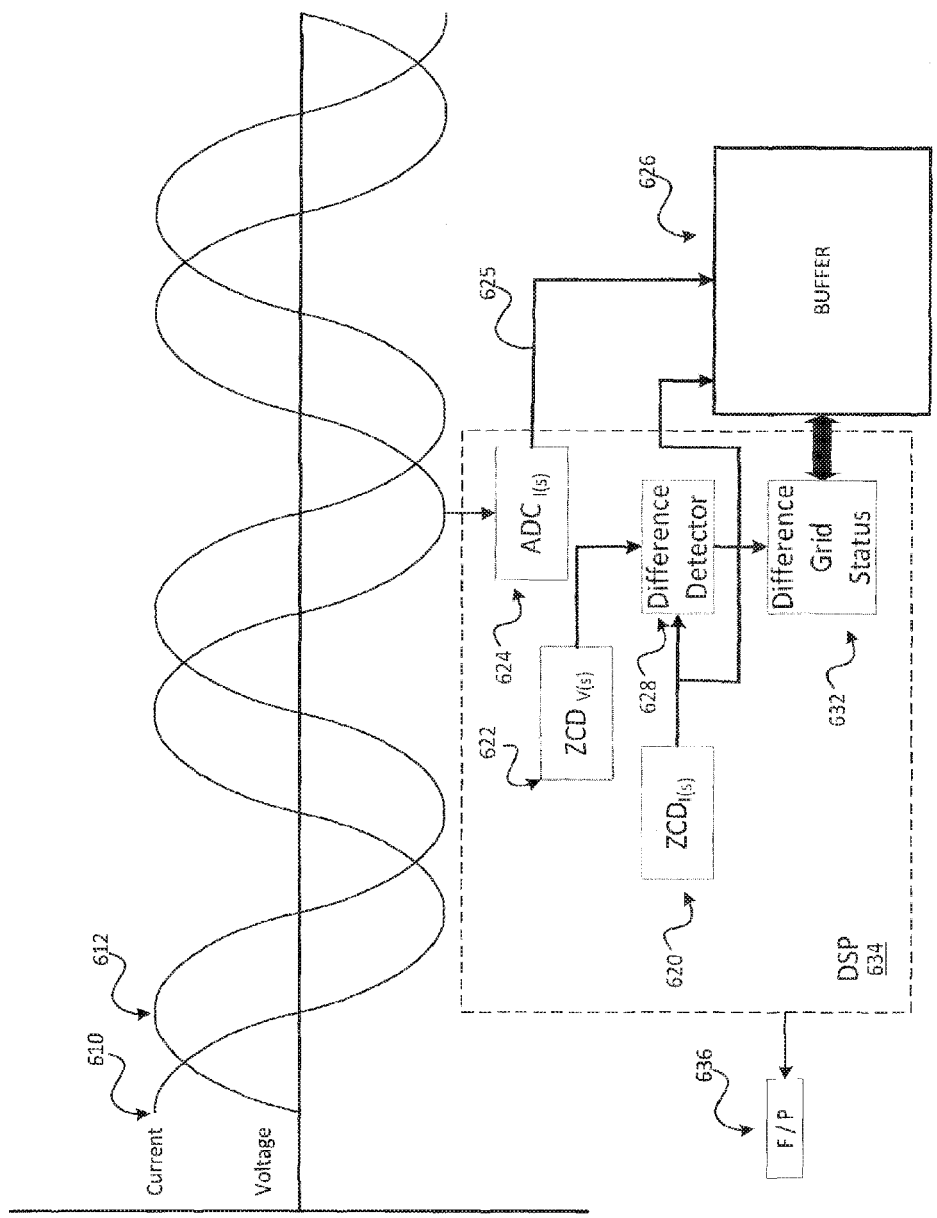
Figure 8:
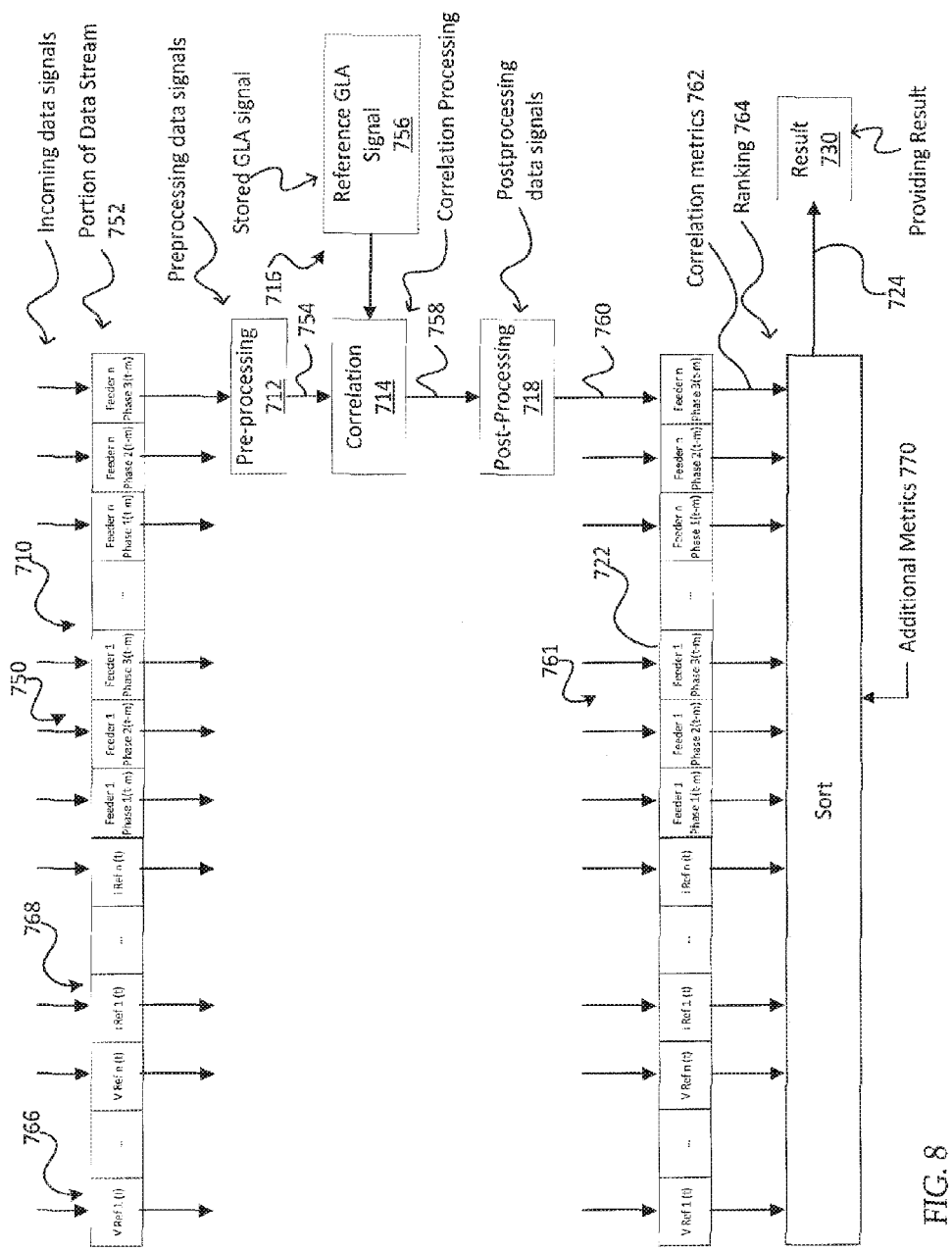
Figure 9:
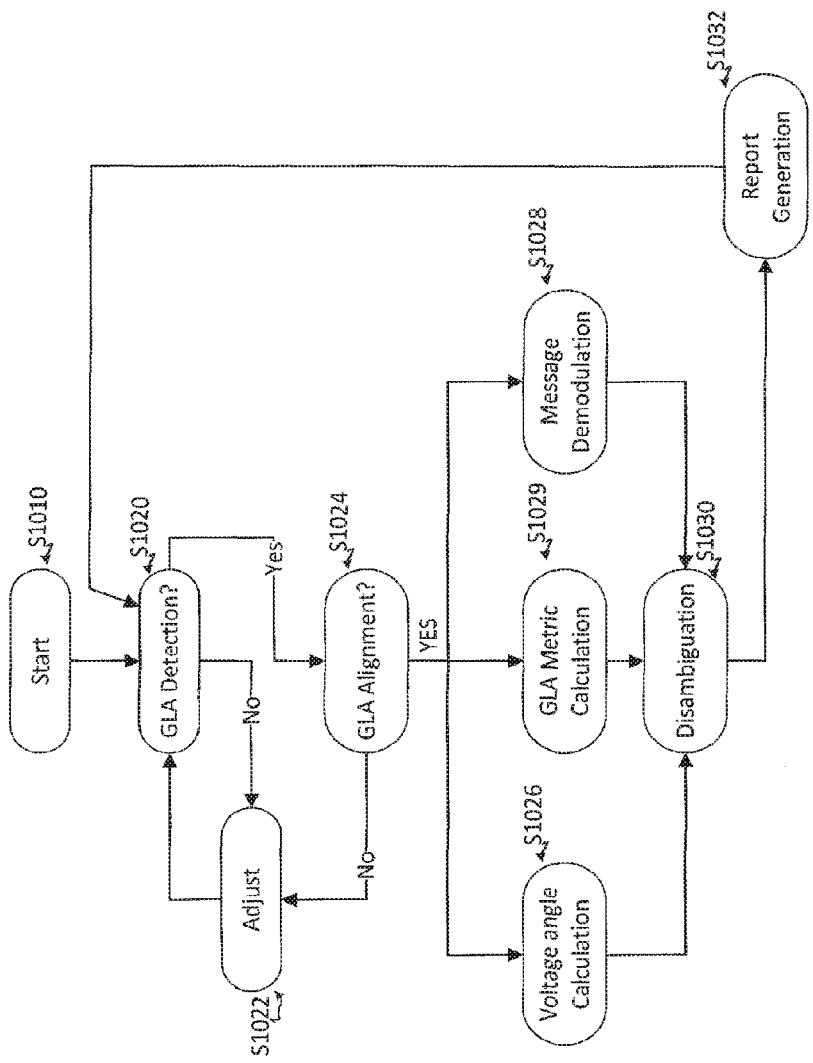

Correspondingly, references throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments. In the drawings:

FIG. 1 is a simplified illustration of the power path from a generation point to a distribution substation to a consumer, showing the high voltage, medium voltage, and low voltage regions of the distribution grid and depicting some of the major features of an electrical distribution grid;

FIG. 2 is a simplified logical block diagram of the intelligent platforms of one embodiment of the invention;

FIG. 3 is a simplified block diagram of the distribution substation apparatus in a Grid Location Aware™ (GLA) network, illustrating how the GLA network apparatus couples to existing current measurement lines in the distribution substation, and how data from a Substation Receiver is backhauled to a data center;

FIG. 4 is a portion of the diagram of FIG. 3 in greater detail;

Figure 5:
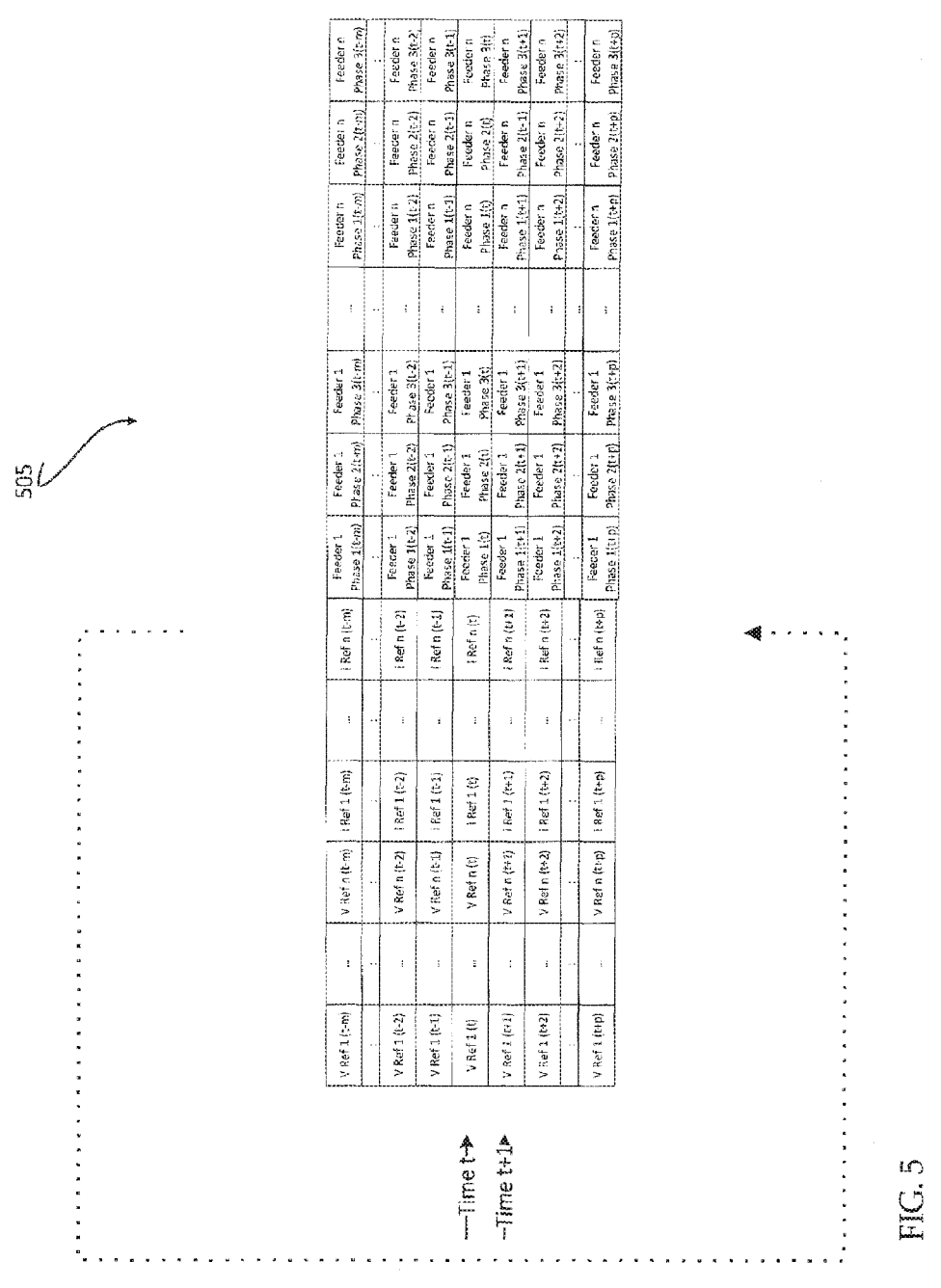

FIG. 5 is a simplified illustration of a data stream;

FIG. 6 is a simplified illustration of a data stream in another aspect;

FIG. 7 is a simplified block diagram depicting an employment of zero cross detectors;

FIG. 8 is a simplified data flow diagram of a methodology, for GLA detection and feeder phase discrimination, in accordance with an embodiment of the invention; and FIG. 9 is a simplified logical flow diagram of a methodology, for GLA detection and feeder phase discrimination, in accordance with an embodiment of the invention.

DETAILED DESCRIPTION

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical, or other changes may be made to the specific embodiments disclosed without departing from the spirit and scope of the present invention.

The following description is provided to enable any person skilled in the art to make and use the disclosed inventions and sets forth the best modes presently contemplated by the inventors of carrying out their inventions. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the substance disclosed.

The present invention discloses a system, method, and apparatus for detecting signals transmitted from downstream transmitters on an electrical distributional grid.

In an embodiment, the present invention discloses a system, method, and apparatus for detecting grid topology based on signals transmitted from one or more downstream transmitters on a distribution grid. In another aspect or embodiment, the present invention discloses a system, method, and apparatus for determining the time of transmission of a signal relative to a transmission point. In a still further aspect or embodiment, the present invention will extract encoded data from the signal to be used for various purposes.

Impairments caused to the transmitted signal, as it transits the channel, are of central concern in establishing optimal communications on the grid. In particular, by continuously (or periodically or sporadically) analyzing the attenuation profile (attenuation versus transmission frequency) of the channel, dynamic selection of optimal frequencies for data communication can be performed and exploited to optimize signal reception for the channel.

Impedance characterization can be accomplished through the use of a constant-amplitude sinusoid, the frequency of which begins at one end of the frequency band over which impedance measurements are to be made, and is increased, decreased or otherwise varied, until it reaches the terminal frequency that defines the other end of the band. This frequency change may be performed linearly, logarithmically, or in any other appropriate fashion. Such a signal structure is commonly known in the technical literature as a swept sinusoid or chirp.

In an embodiment, the invention employs a stimulus-response method. One such embodiment includes a specially-engineered characterizing signal to probe the channel. Rather than a concatenated set of discrete tones, or a continuously swept sinusoid, certain embodiments of the invention employ a concatenated set of spectrally- and temporally-bounded windowed, chirps, each constrained to avoid the fundamental frequency and its harmonics. A well-chosen characterizing signal will tend to mitigate leakage of energy into the frequencies occupied by the fundamental frequency and its harmonics. In many conventional networks, the fundamental frequency will be 50 Hz, 60 Hz, or 400 Hz.

The construction of the specially engineered characterizing signal, also known as the GLA signal, provides additional benefit, in that a cross-correlation computation, performed using the received GLA signal and a reference copy of the transmitted GLA signal (reference GLA signal), provides unambiguous, strong, accurate, temporal resolution of the arrival-time of the GLA signal. In addition, the specially engineered GLA signal provides a method to determine an unambiguous identification of the feeder and phase upon which the GLA signal was transmitted.

In an embodiment of the invention, a computer system (generally located at a substation of a distribution grid) constantly scans the relatively broadband current flow of each phase of each feeder of the substation's distribution grid. These current flows may include on-grid transmission signals being received from one or more downstream transmitters.

In one preferred approach, the computer system is parallel processing data received from each phase of each feeder at substantially the same time. A signal from a downstream transmitter is a data burst having a header and a data packet. The header includes a GLA signal. The computer system processes the data from each feeder phase looking for a candidate signal, i.e., a possible GLA signal. When a candidate signal is found, the computer compares and correlates the received candidate signal to one or more reference GLA signals.

The candidate signal having the strongest correlation to the reference GLA signal likely identifies the feeder and phase upon which the original GLA signal was transmitted. As part of this correlation, the computer system can also determine when the start of the original signal occurred in relation to when the original signal was received at the distribution substation. By comparing the time that the start of the original signal was received at the substation to the closest zero cross, prior or subsequent to the receipt time, of the reference phase of the voltage of the associated feeder taken at the substation, the phase upon which the signal was transmitted on can be determined. Thus, by using the correlation process, the invention can determine the feeder and phase upon which the original signal was transmitted. By using the time stamp process of the correlated signal, the phase upon which the original signal was transmitted can be determined. By using both processes together there is an increase in the probability of identifying the correct phase and feeder upon which the original signal was transmitted.

FIG. 1 illustrates a typical segment of an electrical power grid. An electrical power grid is generally considered to be composed of two logical regions, the Transmission Grid(s) and the Distribution Grid(s). The Transmission Grid originates at large generation points, e.g., power plant 120, such as hydroelectric dams, nuclear reactors, wind farms, solar farms, and coal-fired or gas-fired power plants. Power from the generation point is transmitted as high-voltage alternating current (AC) over a connected network of long, high-voltage lines to points where demand for power exists, such as factories, farms, and population centers. At the edges of the Transmission Grid there is a collection of Distribution Substations, e.g., distribution substation 124. Distribution Substations contain one or more Substation Transformers which step down the voltage from high transmission line levels (typically 130 kV to 700 kV) to the medium voltage levels (currently typically from 4 kV to about 35 kV in the United States, higher voltages are currently used outside the United States, although the specific distribution voltage is not germane to the invention) at which power is distributed to consumers within a distribution service area.

At the edge of the Distribution Grid are a number of Service Transformers, e.g., service transformer 136, which transform the medium voltage of the distribution grid to lower voltages (in the United States, typically 120V, 208V, 240V, 277V, or 480V). Other voltages in addition to some of these can be used elsewhere in the world. In some cases, a tier of one or more transformers, called step-down transformers, e.g., transformer 128, lying schematically between the Substation Transformers and the Service Transformers, create intermediate voltage reductions between the Substation and the Service Transformers.

Each Service Transformer powers one or more metered, e.g., using meter 142, or unmetered loads. A load, e.g., load 150, can be a dwelling, a commercial or industrial building, an element of municipal infrastructure such as a series of street lamps, or agricultural apparatus such as irrigation systems. A typical distribution grid includes other elements used to control, balance, and regulate the flow of power. Examples of such elements are capacitor banks, e.g., capacitor bank 132, voltage regulators, switches, and reclosers.

Distribution grids have been designed and deployed in a variety of topological configurations. In the United States, distribution grid types are typically characterized as radial, loop, or networked. Other emerging cases are the campus grids and microgrids. Additional topologies, not described, are used elsewhere in the world. In a radial grid, a substation has one or more substation transformers. Each substation transformer has one or more substation busses. One or more three-phase feeders "radiate" outward from each substation bus, with single-phase, or three-phase lateral lines branching off from the feeders, and tap-off points (or simply "taps") in turn branching from the laterals. Radial grids are inexpensive to design and build because they are simple, but they are most vulnerable to outages because they lack redundant power paths, so that any break causes at least one load to lose power. Network and loop grids are also well known to one of skill in the art and are equally amenable to supporting corresponding embodiments of the invention.

A distribution substation receives high-voltage power from the transmission grid into one or more large power transformers. A distribution substation transformer may incorporate a type of regulator called a load-tap changer, which alters the voltage that the transformer delivers to a power distribution bus (e.g., a substation distribution bus) by including or excluding some turns of the secondary winding circuit of the transformer, thereby changing the ratio of input to output voltage. Certain embodiment of the invention will operate properly notwithstanding changes in these turns ratios. One or more feeders emanate from the substation bus. If too many feeders are required in order to service the loads or topology, additional transformers and busses are used.

In order to monitor and control the components of the grid, feeder phase current transformers (FPCTs) are attached to power-bearing conductors within the substation. The FPCTs output a relatively low alternating current (typically up to 5 amps) on a looped conductor which is accurately proportional to the current flowing through the high voltage conductor being monitored. These low-current outputs are suitable for connecting to data acquisition subsystems associated with Supervisory Control and Data Acquisition (SCADA) systems or relay protection systems in the substation. FPCTs are designed and built into the substation, because changing or adding FPCTs to the high-voltage components is impossible or dangerous while current is flowing. On the other hand, additional monitoring CTs (MCTs) may be safely added around the low-current loops as needed without interrupting or impacting power delivery.

In addition to the power lines themselves, the distribution grid contains numerous other devices intended to regulate, isolate, stabilize, and divert the flow of power. These devices include switches, reclosers, capacitor banks (usually for power factor or voltage correction), and secondary voltage regulators. All these devices affect the behavior of the distribution grid when considered as a data-bearing network, as do the various loads and secondary power sources on the grid. Devices that have abrupt state changes will introduce impulse noise on the grid, as can loads turning on and off. Some devices, such as transformers and capacitor banks, filter and attenuate signals at certain frequencies and can cause cross-talk of signals above the fundamental frequency of the power delivery system.

Other than the wires connecting a consumer load and the associated meter to a service transformer, the service transformer is typically the outermost element of the distribution grid before the power is actually delivered to a consumer. The meter is attached at the point where the power from the service transformer is delivered to the consumer. Service transformers can be three-phase or single phase, as can meters.

Traditionally, reading meters was one of the largest operational costs incurred by electrical utilities. Original electric meters were analog devices with an optical read-out that had to be manually examined monthly to drive the utility billing process. Beginning in the 1970s, mechanisms for digitizing meter data and automating its collection began to be deployed. These mechanisms evolved from walk-by or drive-by systems where the meter would broadcast its current reading using a short-range radio signal, which was received by a device carried by the meter reader. These early systems were known as Automated Meter Reading systems or AMRs. Later, a variety of purpose-built data collection networks, employing a combination of short-range RF repeaters in a mesh configuration with collection points equipped with broadband backhaul means for transporting aggregated readings began to be deployed. In time, two-way purpose-build collection networks utilizing two-way paging technology and cellular communications were also deployed, either as independent systems, or as a portion of a complex purpose-build data collection system.

These networks were capable of two-way communication between the "metering head-end" at a utility service center and the meters at the edge of this data collection network, which is generally called the Advanced Metering Infrastructure or AMI. AMIs can collect and store readings frequently, typically as often as every 15 minutes, and can report them nearly that often across an entire deployment. They can read any meter on demand provided that this feature is used sparingly, and can connect or disconnect any meter on demand as well. AMI meters can pass signals to consumer devices for the purpose of energy conservation, demand management, and variable-rate billing. Because the AMI network is separate from the power distribution grid, AMI meters are neither aware of nor sensitive to changes in the grid topology or certain conditions on the grid. Nonetheless, the introduction of AMI is generally considered to be the beginning of the Smart Grid.

Many characteristics of the electrical distribution infrastructure have limited the success of efforts to use the grid itself as a communications medium. First, the grid is a noisy environment. State changes in loads on the grid, as well as control and regulation artifacts on the grid itself, cause impulse noise on the power line. Normal operation of loads like electrical motors, simple variations in the overall load, and ambient RF noise (chiefly from lightening and other weather-related causes) add up to significant Gaussian noise.

The measured noise floor at a typical substation in the United States sits at about 80-90 dB below the maximum amplitude of the line fundamental frequency. The complex impedance of the grid varies across both the frequency and time domains. This may lead to loss of signal at an on-grid receiver sited at a higher voltage point on the grid when impedance increases, or alternately force the on-grid transmitter to use more energy than would be necessary on the average.

Capacitor banks sited at points along the grid for the purpose of optimizing power factor can cause signal attenuation. These capacitor banks can be static values or dynamic values, which are changed manually or automatically. Most significantly, transformers act as low-pass filters, dramatically attenuating signals above a certain frequency. The effective passband is not the same on every distribution grid, because different arrangements and types of transformers are employed and because the transformers themselves are not deliberately tuned to filter at a specified frequency above the fundamental. All these variables impact the frequency response of the grid as a transmission medium.

Additionally, injecting modulated current signals on the grid may cause interference between the injected signals themselves. One problematic phenomenon is crosstalk, where a signal injected on one power line is detectable on another line. When crosstalk occurs on two or more phases of the same feeder, it can be caused by inductive and capacitive coupling as the phase lines run alongside one another for most of the length of the feeder. Crosstalk may also be due to multiple phase windings on the same transformer core.

Feeder-to-feeder crosstalk has also been measured, and may be caused by reflection of the injected signal off the power bus at the substation. As will be further discussed below, the amplitude of a signal received at a substation may be higher (at some frequencies) on a crosstalk channel (feeder phase), than on the originating feeder phase. Given the complexity, diversity, and age of the distribution grids in the United States and the world, less is known about these phenomena at frequencies above the fundamental frequencies than might be expected.

Despite the many engineering difficulties inherent in using the power grid as a communications medium, it has remained attractive to electrical utilities because the utility already owns the infrastructure, and it is present at all the points where the utility needs to collect data. Under the umbrella name Power Line Communication or PLC, some medium-frequency power line protocols have been used with success for Smart Grid applications. Despite their limitations, low-frequency systems have achieved market penetration in rural areas where wireless systems are cost-prohibitive.

High frequency communications require additional equipment to allow the signals to cross transformers and capacitor banks. Such signals can also be severely attenuated by passage through underground cables, and can radiate RF signals on overhead lines. Consequently this technology has not been widely adopted.

The problems with, and limitations of, the high, medium, and low-frequency PLC methods as discussed above have led in the 21$^{st}$ century to rapid development of custom built wireless networks for AMI data collection in the United States. High-frequency on-grid methods have proven to be too expensive, not sufficiently reliable, and too fraught with error and uncertainty to be commercially viable. Low-frequency methods can be implemented with low-cost edge-to-substation transmitters, but these lack the data-bearing capacity required by modern AMI. Moreover, on-grid low-frequency substation-to-edge transmitters like AFRC are large, expensive, and have undesirable side effects which limit their use in urban settings. One possible option would be to use high-frequency substation-to-edge transmitters in conjunction with low-frequency edge-to-substation transmitters. However, in the United States, market forces have led to the rapid penetration of wireless AMI systems, especially in urban and suburban areas.

Cost constraints and availability of unregulated spectrum have dictated the use of mesh architectures within AMI networks, with neighborhood concentrators that collect data from a grouping of meters and use traditional infrastructure (POTS, fiber, or cellular) for backhaul to data centers. Mesh architecture means that, although the RF transceivers used have individually high data rates, the edge networks are easily saturated. Most of the available data bearing capacity in these networks is used just for reporting meter interval data, with limited capacity reserved for firmware updates and control packets for applications such as demand management.

There are two major factors that limit the utility of the existing AMI infrastructures. The first is, of course, the capacity limitations of the mesh. The second, and more significant, is the fact that the AMI network is not congruent with the electrical grid. It is capable of providing little information about the operational state of the grid, and is not knowledgeable of the schematic configuration of the gird. This is unnecessary for meter reading, but more sophisticated Smart Grid applications (for energy conservation, asset protection, load balancing, fault isolation, recovery management, and non-technical and technical loss determinations) require accurate information about the schematic relationships of various assets (such as grid assets, load and conditions on the several segments of the grid, and the current state of bi-modal and multi-modal assets). This information, together with the geospatial locations of the same assets, is called the Grid Map.

Utilities typically maintain two maps or models of the Grid. A Physical Network Model (PNM) aggregates the geospatial location of the assets on the grid. PNMs thanks to modern GPS technology, are reasonably accurate with respect to point assets such as substations, capacitor banks, transformers, and even individual meters. Inaccuracies stem from failure to update the maps when repairs or changes are made. For example, a service transformer may be moved from one side of a street to the other as a result of street widening.

Longitudinal assets, especially buried cables, are less well represented in the PNM. The PNM can contain as-designed data, but since, in many places, the cable was laid before global positioning technology had matured, the designs were based on ground-level surveys. Subsequently, original maps may or may not have been updated to reflect changes. Later surface changes complicate the problem of verifying the geographic path taken by medium-voltage distribution lines.

The second model is the Logical Network Model, or LNM. LNMs describe how grid components are connected, without reference to their geospatial location. The LNM changes frequently. During the course of repairs, the way transformers attach to taps and laterals, and meters attach to transformers, may be altered. Such changes affect both the LNM and the PNM.

In many utilities, such changes are recorded manually by field agents. The manual reports may or may not be updated in the LNM and PNM and, when updates are made, the time lag between maintenance occurring and its being recorded is variable. Additionally, many grid components, especially regulators, switches and reclosers, change state asynchronously and/or automatically. Unless these components are instrumented with communications back to a data center, rather than simply being subject to local control systems, such dynamic changes are not reflected in the LNM. They do, however, affect the power path, the load and environmental stress on other components of the distribution grid, and the service level to consumers.

Examples of significant but not reliably known aspects of the (actual) Grid Map are the feeder and phase by which each meter is currently powered. Other significant factors include the relative load on each phase of each feeder, especially on subordinate branches (laterals) of the grid, the actual voltage supplied to each meter, the power factor along the edges of the grid, and whether all the power drawn at a transformer is metered. Additionally, it is important know the state of switch sets, local connections, or protection devices such as fuses, especially after a weather event that has caused outages.

If this information were reliably known, utilities could conserve energy (much of the savings from which would pass on to consumers), save maintenance costs, prolong the life of equipment in the field, improve the efficiency and life of utility and consumer equipment, avoid outages, reduce recovery times after unavoidable outages, and improve operational safety for their field engineers.

The problem of automated dynamic grid mapping is not solved by wireless Smart Meters. The consensus among utilities is that the volatility of the LNM is such that using field engineers to measure and monitor changing attributes of the grid map is generally not a cost effective or workable solution.

Utilities habitually oversupply the line voltage to consumers to ensure that fluctuations in load, power losses in home wiring, etc. do not result in some consumers' service falling below 110 v AC effective at individual outlets inside the building, which is generally the optimum for home appliances and the like. The goal of a well-instrumented fine-grained conservation voltage regulation system might be to reduce the typical effective voltage at a single-phase meter to 114 VAC as measured from one leg of the typical 240 VAC service to neutral in the United States.

Cost constraints also dictate that placing SCADA instrumentation at every medium-voltage field asset is impractical. The "touch points" on the distribution grid are, for better or worse, largely the meters at the edge and the instrumentation in the substations. This dictates that techniques for power line communication be revisited, because signals traveling on the power line can be used both to infer and to report grid mapping information not detectable by means of wireless AMI. The ubiquitous presence of wireless AMI for reporting meter data can be considered as a benefit in the search for effective grid-mapping technology, in that it frees the limited data-bearing capacity of low-frequency on-grid transmission methods to support grid mapping systems instead. It is, however, desirable to identify a transmission method that is low cost at the edge and at other points within the electrical distribution system, coexists with the AMR or AMI, and does not trigger any of the above-noted pitfalls of on-grid transmission. Such pitfalls also include requirements for intermediate devices such as repeaters between the edge and the substation; unacceptable flicker; RF interference; impulse noise; etc. Finally, the transmission must require very little power, because the energy expended driving the transmitters reduces any financial benefits obtained.

Finally, the schematic topology of the grid is subject to change without notice or recordation. Therefore, the source of a signal may not be easily discernable. Consequently, it would be desirable to have a reasonably quick, reasonably low-cost solution to continuously, periodically or sporadically determine changes in the schematic topology of a grid and/or to ascertain the schematic location of a signal source. In addition, having established these schematic locations, there is a wealth of information available that can be analyzed to determine information about other aspects of the distribution grid such as, for example, segments connecting different elements of the grid.

FIG. 2 is a logical block diagram of the intelligent platforms of one embodiment of the invention, showing where the processing elements reside with respect to a network. The exemplary network illustrated includes a wide area network such as the Internet, an AMI, and a medium voltage electrical distribution grid, or other such medium. Connected at the edge, or an internal junction point, of the medium voltage electrical distribution grid is at least one downstream transmitter.

FIG. 2 shows that the system may be divided into three regions or tiers. The edge tier 301 includes at least one downstream transmitter. The downstream transmitter, e.g., downstream transmitter 305, can be located at a service transformer 303 or the downstream transmitter, e.g., downstream transmitter 304, can be located at a power consumption site underneath the service transformer.

The invention does not require the installation of communication devices or other modifications between the edge tier and the substation tier. However, if it is desirable to collect data from a feature of the medium-voltage grid, such as a capacitor bank, a variation of the downstream transmitter may be installed there. Such a downstream transmitter is technically still at the Edge Tier, since it is powered by a low-voltage outlet located at the feature, and not directly from the medium-voltage line(s) upon which the grid feature is installed.

Still referring to FIG. 2, the substation tier 306 comprises at least one Substation Receiver 307 operable to receive transmissions from the downstream transmitter in the edge tier, or intermediate junction point, without recourse to any signal amplifiers, bypass mechanisms, or bridges installed on the medium voltage infrastructure of the electrical distribution grid. The Substation Receiver(s) connect via a local area network to a Computing Platform 308 containing non-volatile computer-readable memory and a CPU for storing and executing the software 309 which maintains the Inventory and Grid Map databases and carries out the tasks of provisioning and managing the data network.

Additionally the Computing Platform stores and executes software 310 which processes the Inventory and Grid Map data in combination with messages received from the Substation Receiver 307 to infer information about the state of the Grid over and above what the Substation Receiver alone can detect based only on incoming transmissions. The combination of the substation receiver 307 and its associated computing platform 308 is also referred to as a Feeder Intelligence Module (FIM).

In an embodiment of the invention, a substation receiver 307 includes a number of analog-to-digital (A/D) converters, although typically depicted as the A/D converter being located outside of a substation receiver 307. Each A/D converter is coupled to a prospective sensor on each feeder phase looped conductor, i.e., each phase of each feeder supports an A/D converter. In one embodiment, the signals received from the phases of the feeders are current wave forms. In one approach, the A/D converter is located near each MCT on each respective feeder phase input line. (FIG. 3)

The FIM includes MCTs coupled to the outputs of the FPCTs. The outputs of the MCTs are, in turn, connected to the inputs of the A/D converters respectively. Desirably, the A/Ds are located near the respective MCT on each feeder phase current loop. (FIG. 3) In one approach, when processing signals, the substation receiver 307 ignores signals at the grid's fundamental line frequency and its integer harmonics.

Referring back to FIG. 2, each distribution substation has at least one substation transformer. Depending on the type and number of loads connected to the substation, there may be more than one substation transformer in a substation. The substation transformer and its topology—the circuits and features between the substation transformer and its loads, inclusive—is generally referred to as a Substation Domain. In an exemplary case, the system includes a substation receiver 307 uniquely associated with each substation transformer. In this exemplary case, the substation tier 306 has two substation domains corresponding to the two substation receivers 307. In other approaches, a substation receiver 307 is shared by more than one substation domain, or a substation domain has more than one substation receiver.

In some embodiments of the invention, the computer-based components of the Substation Receiver and the Computing Platform components are hosted on the same processing subsystem. In such embodiments, the communications protocol (such as HTTP) used to transfer data between the Substation Receiver and the Computing Platform software components need not change, even though there is no physical local area network required.

In one embodiment, Computing Platform 308 connects to a conventional wide area network 311, such as the Internet, for the purpose of communicating with a Concentrator 312 in a data center tier 313. In some embodiments of the invention, and regardless of whether the Computing Platform and Substation Receiver are co-located or on separate processing subsystems, the processing subsystems may be configured in a redundant cluster to ensure continuous operation of the system.

Referring again to FIG. 2, in certain embodiments the Concentrator 312 hosts software with an analogous architecture to the software in the substation(s). Such an architecture may include a network and data management component 314 providing software services to one or more applications 315 for GLA. The applications use conventional network-based messaging protocols such as, but not limited to, JMS, SOAP, and REST to publish information to subscriber applications such as a Geographic Information System (GIS) 316.

The data and network management component 314 may integrate with an AMI head-end 317 for the purpose of causing the AMI network to broadcast data blocks to the Downstream Transmitters in the edge tier 301 or at intermediate junction points. Data and network management component 314 may integrate with AMI head end 317 using a standard protocol and/or a proprietary interface.

Other embodiments of the invention may employ alternative ancillary network components. For example, Substation-to-Edge broadcast capability and/or time synchronization from the substations to the Downstream Transmitters may be provided by medium-voltage PLC transmitters attached to the feeders at the substation rather than using an AMI for this purpose.

Likewise, a separate radio transmitter broadcasting messages originating at the distribution substation may be employed. The radio transmitter does not need to be physically located at the substation as long as there is a communications path from the Computing Platform at the substation to that transmitter. A single radio transmitter may serve as the Substation-to-Edge channel for a multiplicity of substations. When the Substation-to-Edge channel is not an AMI, synchronization of the downstream transmitter clocks may be provided as described in U.S. patent application Ser. No. 13/566,481, titled System and Methods for Synchronizing Edge Devices on Channels without Carrier Sense, which is incorporated herein by reference. One of skill in the art will appreciate that, in embodiments of the invention where channels are not time slotted (for example, TDMA), clock synchronization is unnecessary.

FIG. 3 is a simplified block diagram of a typical distribution substation apparatus in a GLA network and edge of the grid topology. FIG. 3 includes a distribution substation 440 which includes a substation transformer 442 which is electrically coupled to a distribution bus 430, which, in turn, is electrically coupled to feeder phase lines 421. The edge of the grid includes a plurality, e.g., n, of feeders 410, each feeder 410 having three feeder phase lines 421. Each respective feeder phase line is typically connected to a load 418 through a service transformer 414. A downstream transmitter 417 is located near a service transformer 414 and/or a downstream transmitter 416 is located next to/or part of a meter. The distribution substation 440 also includes a SCADA/protection relay 420 which is electrically coupled to feeder phase lines 421 through loops 426, respectively. The FIM is also electrically coupled to loops 426 through A/D converters 422 and MCTs 424, respectively.

FIG. 3 details how in, one embodiment, the FIM monitors the feeder phase lines 421 on the low-voltage side of the substation transformer 442 by attaching MCTs, e.g., MCTs 424, to the SCADA/protection relay loops, e.g., loops 426, already in place to the SCADA, or protection relay, 420. This coupling method allows a Substation Receiver to be installed in a distribution substation without disrupting the operation of the substation. Other coupling methods such as hot-stick clamp-on current transformers are well known in the art, and may be equivalently employed in lieu of the secondary coupling to SCADA loops described herein. Some distribution substations 440 may lack SCADA loops 426, or existing loops may be inaccessible due to physical placement or utility regulations.

FIG. 3 also shows the MCT 424 connections to the A/D converters 422. The A/D converters 422 digitize the analog current signal read from the output of the MCTs, which output is proportional to the current flowing through the corresponding feeder phase as measured by its FPCT 425. In certain embodiments, the resulting digitized signal is conveyed to one or more FIM computing element by means of one or more FIM switches (not depicted in FIG. 3 for reasons of simplicity). As one of skill in the art will appreciate that, in an exemplary system, the computing element will include, but is not limited to, one or more of a conventional microprocessor-based computer, a Digital Signal Processor, or other signal processing device such as a Field Programmable Gate Array and/or Graphics Processing Unit. In certain embodiments, the FIM encompasses all of the electronics of a substation receiver, not all necessarily in the same rack. The FIM switch performs several functions including collecting signals from the A/Ds. FIM switches also provide power over the Ethernet connection to the A/Ds 422.

The FIM switch also sends out a common clock to all of the A/Ds, which digitize a clock signal as part of the A/D processing. This digitizing of a clock signal allows time stamping of the individual A/D data streams to allow subsequent alignment of said streams. In one embodiment, the FIM switch has a very fast, e.g., gigabit Ethernet, connection to the FIM computing element.

In one embodiment, the FIM computer is a very fast, multi cored computer that substantially permits parallel processing of each of the channels. In one such implementation, the FIM computer will include two 20 core Intel Xeon-based processing elements. As such, up to 40 process 'threads' can be performed substantially simultaneously.

Although not shown, the FIM processing element receives one or more voltage reference signals from the distribution substation. In one embodiment, these reference signals are received through an FIM switch. These signals are a digitization of respective AC voltage waveforms, as measured at the distribution substation. In most circumstances only one voltage reference signal is required for a substation. There are, however, configurations in which multiple voltage reference signals are required, and others in which no voltage reference signals are required.

In implementing a system according to principles of the invention, it is desirable to measure voltage angle as a grid characterization parameter. Certain embodiments of the invention achieve voltage angle measurement through the following means: dispatch of a GLA signal from a downstream transmitter is synchronized to a voltage zero crossing of the fundamental line frequency at the downstream transmitter. Preferably, the voltage signal zero crossing event is detected in a pure form, having eliminated all signal harmonics and extraneous noise and taking special care to avoid uncompensated time delays in processing of the signal. At the distribution substation, a similar measurement is made of the fundamental line frequency voltage zero crossing. The time of this substation voltage zero crossings is compared to an arrival time of the GLA signal at the substation receiver to measure any time offset. This process is repeated for every received GLA signal.

As a practical matter, transit time for the GLA signal between the downstream transmitter and the substation receiver is considered manageable. Any measured time differential consists of three components: One is the time it takes the fundamental frequency to propagate from the substation to the downstream transmitter. A second is the actual voltage angle shift that is the desired parameter being measured. A third component of the time differential is the propagation time for the GLA signal from the downstream transmitter back to the substation.

In certain circumstances, it is desirable to compensate for the first and the third of these factors, as well as other measurement and processing delays that may be inherent in the system. After such compensation, any time differential between the fundamental line frequency zero crossing at the substation and receipt of the GLA signal at the substation is attributable to voltage angle differences.

It will be appreciated by one of skill in the art that any such voltage angle difference reflects physical characteristics of the grid between the downstream transmitter and the substation receiver. Consequently, the FIM can store voltage angles and subsequently compare these values to newly measured voltage angles, whereby any change in the measured voltage angle can provide valuable information regarding electrical characteristics of the grid and/or its operational state. One of skill in the art will also appreciate that the zero crossing detections described above may be implemented in software, in hardware, or in any combination of hardware and software.

In certain circumstances, it will be adequate to employ a single zero crossing detector for all feeders and phases coupled to a particular distribution substation. In other embodiments, it will be desirable to have multiple zero crossing detectors. For example, where a distribution substation has more than one transformer, it may be necessary to employ multiple zero crossing detectors.

When a downstream transmitter sends data to a computer system managing the electric grid, it usually is sent in the form of a data packet preceded by the GLA signal. A GLA signal is, typically, a signal with a plurality of chirps across a range of frequencies. The invention system looks for this GLA signal to determine where the data packet is located by comparing the characterizing sizing against a stored characterizing signal to find the greatest correlation.

A characterizing signal, e.g., a GLA signal, is generated and sent, generally, from a transmitter located at an edge of an electrical grid and the signal is subsequently received at an interior spot of the electrical grid, e.g., a substation. In the interior spot, the GLA signal is filtered and correlated to a copy of the GLA signal. In an approach, the GLA signal is filtered in a manner to remove unwanted and/or undesirable portions of the signal. The resulting signal is compared to a copy of the characterizing signal and run both signals through a cross correlating filter that generates a signals that demonstrates the similarities and differences of the signals. A band pass filter to just get the sorted the signal. It is the measure metric of the system and is compared channel to channel and a decision based on the many or all of the channels.

In a preferred approach, this measurement of the GLA signal received from a transmitters is a substantially instantaneous measurement, the system does not rely or generalize utilize an older, previously received GLA signal on the same channel. Every time a message is sent, this GLA is a precursor to the message. The path of the signal is determined every time a message is sent—the GLA path. It is important to process the GLA signal anew because characteristics of the grid, e.g., impedance, can change over time, even a short amount of time.

The GLA signal is used for packet synchronization and drives the feeder-phase discrimination algorithm. In certain embodiments the reference GLA signal is prepared in advance of any application, and a stored representation is subsequently applied in real time. In other embodiments, a reference GLA signal is generated entirely or partially in real-time, either at the remote transmitter, at the substation receiver, or both.

In an embodiment utilized on an exemplary 60 Hz fundamental electrical grid (one of skill in the art will readily adjust for other fundamental frequencies), the GLA signal consists of a sequence of 25 non-overlapping windowed frequency chirps with a total duration of 3 seconds. Each chirp is designed to span a frequency range of 50 Hz between two consecutive harmonics. A spectral window (in this case a Tukey window) is used to provide a smooth transition between consecutive chirps.

In one embodiment, a frequency chirp spanning some frequency range [f_c, f_c+50] Hz is interpreted as a "prototype" chirp spanning the frequency range [0,50] Hz that is subsequently translated up to the f_c Hz band. This interpretation is based on a conventional definition of a chirp. To see this, consider the following chirp, sweeping out the range of [f_c,f_c+50] Hz:

$$x(t) = \exp\left(2\pi i\left\{f_c t + \frac{k}{2}t^2\right\}\right) \quad (1)$$

Where k=50/T is the rate at which the frequency changes from f_c to f_c+50 over a time-period of T seconds. Using complex arithmetic, this equation may be broken up and written as $$x(t) = \exp(2\pi i f_c t) * \exp\left(2\pi i \frac{k}{2} t^2\right) \quad (2)$$

A benefit of expressing the signal in this way is that the term to the right of the multiplication is independent of the particular chirp. The expression on the right side of the multiplication is multiplied element-wise with a Tukey (or tapered cosine) window to allow for graceful transitions between adjacent chirps. In an embodiment, the Tukey window used in the computation of each GLA chirp is defined piece-wise as follows:

$$w(x) = \begin{cases} \frac{1}{2}\left\{1 + \cos\left(\frac{2\pi}{r}\left(x - \frac{r}{2}\right)\right)\right\} & 0 \le x < \frac{r}{2} \\ 1 & \frac{r}{2} \le x < 1 - \frac{r}{2} \\ \frac{1}{2}\left\{1 + \cos\left(\frac{2\pi}{r}\left(x - 1 + \frac{r}{2}\right)\right)\right\} & 1 - \frac{r}{2} \le x \le 1 \end{cases} \quad (3)$$

where r is between 0 and 1 (inclusive) and x is an N-point linearly spaced set of samples between 0 and 1 (inclusive). Parameter r controls the shape of window; it is the parameter that can be adjusted forward and back. This adjustment affects the tradeoff between the sharpness of the falling edges on both sides of the chirp and how much ripple is in the path span of the chirp.

In a one approach, and as discussed above, the GLA signal in the substation receiver is precomputed and stored, having been generated offline rather than during signal processing of the incoming signal. First, a desired GLA signal waveform is selected and the entire GLA signal is precomputed; a GLA signal is 3 (three) seconds long at fifteen (15) k, which is forty-five (45) thousand samples. The Tukey window is temporarily created and applied to all of the sub chirps of the signal which comprise the entire GLA signal. For example, a single sub chirp is generated which scans a particular frequency range of 50 Hz, generate Tukey window, and multiply the result of the Tukey window component wise by the sub chirp. This is done for all of the sub chirps and the results is concatenated together. This is the stored GLA waveform. There is configuration file that points to the GLA text file. The GLA file is digital samples; the value of the waveform at any given point. It is normalized to 1, so that max value is 1. It is textual representation of the waveform, point by point. In an approach, a FFT equivalent of the GLA waveform is stored. The Tukey window is not generated on the fly. It is used to generate a chirp which is stored in the file. In one approach, Matlab is used to generate the chirp. Note that the GLA signal can be shorter or longer than the 3 (three) second duration, as required for the characteristics of a particular distribution grid.

Conversely, the GLA signal can be generated as it is needed where, for example, local memory of a particular downstream transmitter is constrained. In another approach, the GLA signal of the transmitter is stored in, for example, downstream transmitter memory.

In certain embodiments, the sequence of chirps of a GLA signaled permuted. When observing and examining the grid, it has been noticed that there is, or may be, other signals that sweep across the spectrum, and these signals can possibly interfere with GLA signals from the downstream transmitters. By permuted the GLA chirp sequence, the GLA signal can be made to more discernible and less likely to be affected by such spurious signal.

It will be apparent to one skilled in the art that, that for any GLA signal or collection of GLA signals, the representation of the same GLA chirp sequence for the GLA signal must be available both at the downstream transmitter and at the substation receiver. It will be likewise appreciated that a downstream transmitter may select among a plurality of GLA signals (e.g., chirp sequences) for any given transmission. Detection of a specific GLA sequence at a substation receiver can convey additional information. It should be obvious to one skilled in the art that a substation receiver may be designed to detect any GLA signal presented, without a priori knowledge of the specific GLA signal being transmitted from the downstream transmitter.

It will be also be appreciated that, in certain circumstances, the choice of a particular GLA signal can result in improved performance. The use of adaptive learning with respect to acquiring and learning about features of a grid or parts of a grid may be employed to select GLA signal(s) for use in the system.

The substation receiver continuously receives from the electrical distribution grid various signals including GLA signals from downstream transmitters. The signals initially arrive at the substation receiver in an analog form and are converted to digital form through A/D converters associated with respective feeder phases. The resulting digital data is associated with its respective feeder phase as it is stored by the FIM. The FIM stores the digital form of the signals (the digital signals) using an appropriate method such that the signals can be subsequently analyzed by the FIM. In light of the foregoing, it will be appreciated that there will be one digital signal, associated with each feeder phase of the system. Moreover, the digital signal associated with a feeder phase will encode a digital version of an analog signal received at the substation receiver through that particular feeder phase.

To conceptualize the data stream, digital signals arriving from respective feeder phases are synchronized in time. The samples in the data stream are aligned in such a manner that the same sample numbers between receivers represent the same point in time. At sample time, the FIM gets data from all channels at substantially that time. The channel data comes in parallel and a GPS signal helps synchronize the data to each other. In an approach, the digital signals are locked to within 1 sample of each other (depending on what sample rate). Capture point of the digital signals is implicitly tracked based on the hardware circuitry, e.g., the specific A/D circuit, so that the system knows which feeder phase each digital signal came in on.

See, for example, FIG. 4, which depicts a portion of the system shown in FIG. 3. As depicted in FIG. 4, there are a plurality of loops 426 that connect downstream to FPCTs 425 (FIG. 3) of respective different feeders and one of the three phases on each feeder. As depicted in the figure, there are three electrical lines each coupled to a respective loop 426 on one end and the other end is coupled to the input of a respective A/D converter 422. The output of the A/D converter 422 is coupled to a respective storage location in a data stream 516 to store the digital representation of the incoming analog signal. The data stored in data stream 516 is subsequently time aligned by arrival time to the substation receiver and then stored in the time aligned buffer 505. In a preferred approach, all of the channels are received at substantially the same time, digitized at substantially the same time, and stored in a respective location at substantially the same time. In an approach, zero cross data reflecting the phase or time offset of the current on the grid at the time that the rest of the channels are being processed. In an approach, a time stamp, e.g., T base, reflective of the time that the signal was received at the substation is also digitized and stored along with each feeder.

In an aspect, a data stream 505 of the invention stores many rows of data, although one row of data is shown in FIG. 4, where the number of the rows will be system specific. In an embodiment, 60 rows of data before and 60 rows of data after a time t, is stored and is generally sufficient to enable a processing unit lag behind and not be required to process all of the data from the channels in real time; instead it can operate in "near real time." See, for example, FIG. 5, which depicts a representation of a portion of a data stream 505. The data stream depicts horizontal rows of data, where each row includes representing data from Feeder 1, Feeder 2, ..., Feeder n, where each Feeder has a respective three phases of data. The data stream 505 depicted is representational of the entire data stream 505, which is substantially continuous in time. The data stream of FIG. 5 depicts the digital data of Time t as well as a few rows of data collected before and after Time t. In other terms, the data stream is a circular buffer whereby data in the stream can be accessed for a period of time, depending on how big (how much time is saved) the stream is and how often new data is added.

In another perspective, as depicted in FIG. 6, the data stream is substantially continuous and is not segmented into packets as might be suggested by FIG. 5. When analyzing the data of the data stream, the FIM examines a chunk of data stream—it takes data starting at a certain time, e.g., x, across all channels for a specified length of time. At a subsequent time, the FIM examines another data chunk of data stream starting at a different time from t, e.g., t+delta. In an approach, as the invention analyzes data in the data stream 505, the system may analyze at least partially overlapping data chunks.

This approach of storing a data stream provides increased flexibility in data analysis, include the ability to randomly access the data in the buffer. Typically, in current analysis systems, data flows through the systems like an actual stream; the systems can't back up and examine data back in time. Further the current analysis systems can't examine data more than once, or realign data. Therefore the present implementation provides a great flexibility in be ability to analyze the data. In a limitless environment, the continuous stream of data would be stored and always be accessible. In an approach, sixty (60) seconds of data across all the channels is stored. Therefore, in the middle of the data stream there would be approximately thirty (30) seconds in front and behind that time.

This implementation of a continuous data stream having a stored segment creates an increase in the elasticity of the invention. Part of the data stream is implemented using buffers, such that if a compute step falls behind, there is no loss of data. Ideally, the buffers hold data until the system performs the actions that need to be done. In implementation, the FIM uses the data stream to access stream at a time for a certain length of time which can provide a big chunk of data. The FIM processes which are processing the data stream are generally not aware and do not need to be aware of how the data is being stored or provided in the data stream. In a preferred approach, the FIM employs a multi-threaded approach to processing data in the data stream, preferably having a unique process for each of the channels, i.e., each of the feeder phase combinations. In a current implementation, the FIM extracts a data chunk, a certain portion from the data stream. Currently the chunk is set to 4 seconds in length, although any length can be set.

In an embodiment of the invention, the FIM seeks to detect the GLA signal. As indicated above, it can be difficult to detect the actual GLA signal due to the signal being affected by characteristics of the grid. This difficulty can be magnified by the imperfect timing synchronization between the FIM and the downstream transmitters, such that the FIM does not know where, e.g., at what time, in the data stream the GLA signal is located. These effects, separately or in combination, can also make it difficult to accurately determine the feeder phase from which the signal originates.

FIG. 7 depicts signal processing that takes place within the processing element 634. As indicated, the analog-to-digital converters 624 receive respective current inputs and voltage references from the feeder phases. The ADCs produce respective digital signals 625 which are stored in a buffer 626. The processing element 634 acts to synchronize data streams of the respective digital signals within the buffer and thereafter to determine zero crossings of voltage 622 and current 620 by analysis of the data streams.

FIG. 8 depicts a simplified data flow diagram illustrating a method for detecting a GLA signal and for identifying the feeder and phase associated with that signal. A plurality of incoming signals, received from the electrical distribution grid, are digitized to form digital signals 750 which are stored as time-aligned data streams in a buffer 710. In certain embodiments, the time aligned data streams will include voltage reference data 766 and current reference data 768 measured at the substation.

FIG. 8 shows a portion 752 of the time-aligned data stream within the buffer 710. In certain embodiments of the invention, aligned portions of the time aligned data stream are processed concurrently in parallel. It will be appreciated by one of skill in the art, however, that such parallel processing is not mandatory for operation of all embodiments of the invention.

Processing of the time-aligned portions of the data stream proceeds through pre-processing 712. Preprocessing may, for example, include performing a digital filtering of the data streams so as to effect a bandpass filtering of the corresponding digital signals. The resulting band-pass-filtered digital signals 754, are then further processed through a correlation 714 which compares the respective digital signals to an encoded reference copy of the GLA signal 756. The correlation produces a digital correlation output signal 758, which is received into a post-processing step 718.

In certain embodiments, the postprocessing step 718 will extract an envelope signal 760 of the digital correlation output signal 758. The envelope signal 760 is further analyzed 761 to evaluate certain correlation metrics 762, which are sorted in a ranking process 764. One of skill in the art will appreciate that additional metrics 770 may be employed in the ranking process. The sorted metric results 724 are further evaluated to identify a result 730 which corresponds to the feeder phase electrically coupled to the downstream transmitter originating the detected GLA signal.

In certain embodiments, as depicted in FIG. 8, a data stream portion corresponding to a Feeder Phase, at a time beginning t, is processed. At first the data is pre-processed 712. Typically, this preprocessing would include running the data through a bandpass filter that removes portions of the spectrum outside the band of interest. Notch filters could also be employed to filter out some undesirable signals within the band of interest, e.g., harmonics, signals around the fundamental frequency and/or signals around harmonics of the fundamental frequency of the electrical system.

The resulting pre-processed signal is then provided to a correlation process 714 which cross-correlates the pre-processed time domain signal with a reference GLA signal, employing a FFT-based process. One of skill in the art will appreciate that both time domain and frequency domain cross-correlation techniques may be applied.

The signals resulting from the correlation process are then post processed 718 (in some cases, employing a low pass filter), to achieve an envelope of the correlation signal. The resulting envelope signal from the post processing is further processed to derive a collection of correlation metrics that relate to a degree of correspondence between the GLA signal and the reference GLA signal. These metrics are stored in a data store 722. The resulting correlation metrics (and potentially other metrics 770) are used to rank the signals, and the best signal is selected as the result 730.

FIG. 9 depicts a simplified logic flow diagram for the FIM processing to detect a GLA signal and identify the phase and feeder where the signal originated. One of skill in the art will appreciate that the processing illustrated in FIG. 9 will execute iteratively and continuously.

GLA detection process segment S1020 shows one approach to detecting the GLA signal (if present) by correlation with a reference GLA signal. The first state encountered in the logic flow is referred to as the GLA Detection state. In this state, a request is made to the data stream for a user-specified matrix of time-domain digital samples for all feeder phases. A reference GLA signal is cross-correlated against the array of time-domain samples.

In one embodiment, the resulting metrics collected from this state are one or more of crest factor, kurtosis, the peak cross-correlation value, and the sample number of this peak value relative to the requested data. One of skill in the art will appreciate that these metrics, and others, will correspond to the metrics 762 and 770.

In one embodiment, data for all feeder phases of interest is requested from the data stream and the returned data is sliced and given to multiple threads. In certain embodiments, there is a one-to-one correspondence between threads and feeder phase signals to process. Furthermore, in some embodiments, the threads associated with these processes need not share memory.

Each thread executes a cross-correlation algorithm on its associated data slice. In one embodiment, a data slice first goes through a channel-dependent conditioning algorithm that filters unwanted noise effects. In the current context, this may include in-band electrical system fundamental harmonic frequencies. The preprocessing algorithm may be static, or dynamic. Pre-processing algorithms typically include band pass filters, e.g., FIR, IIR, and notch filters, but are not limited to those filters.

The filtered data is then cross-correlated with a reference GLA signal. In one embodiment, each thread has its own reference GLA signal. The cross-correlation may be executed in the time-domain or the frequency domain. If the cross-correlation occurs in the frequency domain, then it may make sense to store the reference GLA signal in the frequency domain as well.

In one embodiment, all samples generated from the cross-correlation algorithm (referred to as cross-correlation profile) are retained and its envelope is extracted. The algorithm used for envelope extraction may be dependent on whether the cross-correlation occurs in the time or frequency domain.

If the cross-correlation occurs in the frequency-domain, then a frequency-domain Hilbert transform may be used for envelope extraction. The function that produces the envelope cross-correlation profile is described as follows: Letting f(•) denote a generic representation of a function that has time-domain signals as inputs and outputs for its time-domain envelope, this algorithm may be summarized by the following equation:

$$f(x*y) = |\text{IFFT}(\text{Hilbert}(X \times Y^*))| \quad (4)$$

where Hilbert(•) denotes the frequency-domain Hilbert transformer and IFFT(•) denotes the inverse Fast Fourier Transformed, as is common practice.

In a preferred approach, GLA correlation metric functions associated with each thread are applied. More specifically, crest factor and kurtosis algorithms are applied to the cross correlation profile of each feeder phase signal. Although these GLA correlation metric functions are typically not suitable for systems operating on a sample-by-sample basis (as they generally require large amounts of data to be meaningful), these functions are applied because they are amplitude independent and are capable of capturing the shape of the underlying signal. In the GLA Detection context, these functions are effective for capturing the sharpness of the cross-correlation profile when a GLA signal is present in the data slice.

For example, if x denotes a cross-correlation profile computed over an arbitrary feeder phase signal, the crest factor can be computed as follows: let $$x = \{x_1, x_2, \ldots, x_n\} \quad (5)$$

be a sequence of real numbers, then:

$$x_{rms} = \sqrt{\frac{1}{n}(x_1^2 + x_2^2 + \ldots + x_n^2)} \quad (6)$$

is the root mean square of the sequence. With this definition, the crest factor of the sequence x may be expressed as:

$$\text{crest}(x) = \frac{\max(|x|)}{x_{rms}} \quad (7)$$

where $$|x| = \{|x_1|, |x_2|, \ldots, |x_n|\} \quad (8)$$

is the sequence of absolute values. Kurtosis is defined to be:

$$kurt(x) = \left\{ \frac{\frac{1}{n}\sum_{i=1}^{n}(x_i - \bar{x})^4}{\left(\frac{1}{n}\sum_{i=1}^{n}(x_i - \bar{x})^2\right)^2} \right\} - 3 \quad (9)$$

where $\bar{x}$ is the mean value of the sequence x.

Every feeder phase signal is given a score based on crest factor and kurtosis. Then a final score is computed based one or more resulting metrics, where the sub final score is the Euclidean norm or the scaled norm of those metric. After acquiring the sub final score, the FIM sorts the channels based their sub final score. Subsequent to this sorting, the FIM normalizes the sorted list and that provides the final score.

Although the foregoing discussion is based on the using crest factor and kurtosis as GLA correlation metric functions, other approaches separately or in combination can be employed. Using crest factor provides a signal-to-noise ratio (SNR) like quality to the cross correlation profile and kurtosis provides a measure of the peakedness of the cross correlation profile. Other approaches include, but are not limited to, using a skew algorithm.

Thus, after application of the GLA correlation metric functions, the likely presence of a GLA signal is indicated.

If the cross-correlation attains, or exceeds, a user-specified GLA detection threshold level on at least one channel, then the process continues to the GLA Alignment process segment S1024.

A GLA detection threshold level may be programmed into the parameters of the system. In general, the threshold level is provided by a user or controller of the system. In another approach, adaptive learning is applied to determine and set a threshold level. In an approach, the threshold level is based on empirical evidence to establish its value. In general the value of the threshold level is based on crest factor and the number may change over time, and may change depending on characteristics of the distribution grid.

If the cross-correlation fails to attain the user-specified threshold level on all channels, then the GLA Detection state is repeated in process segment S1020. If no GLA signal is found, the process continues to segment S1022, where a later sample of the data stream is requested. If a GLA signal is found, then the process continues to segment S1024.

In segment S1022, the FIM adjusts the start time of the data stream that is being analyzed. For example, if the current data stream start time is x, where x=12 seconds, then x is adjusted by an x delta. For example, in one embodiment, the increment x delta might equal 0.25 seconds, thus x=12 second+x delta=12.25 seconds.

If no GLA signal is found during GLA detection, then a later portion of the data stream is evaluated, looking again for the next GLA signal. In one embodiment, the time advancement is set to ¼ second, but this will be configured by a practitioner of ordinary skill in the art according to the requirements of a particular application. The time advancement increment is chosen in a manner to avoid missing GLA signals that are present.

In the GLA alignment process information from the previous alignment step is used to request new data from the data stream. The start of the new data is aligned relative to an estimated location where the GLA signal begins in the data stream. In a particular embodiment, data is requested from a time one half second prior to the time of the beginning of the GLA signal and for a duration sufficient to capture the entire GLA preamble, data packet portion, and additional samples beyond.

If the GLA Alignment state is initiated, then there is at least numerical evidence that the GLA signal is present in at least one feeder phase signal and has enough power compared to the noise to warrant further investigation, e.g., the signal was above a GLA detection threshold level.

If at least one channel contains sufficient signal, further processing is executed by subsequent processes: GLA metric calculation and feeder phase determination S1029, Voltage angle calculation and termination S1026, and message demodulation S1028. These measurements are completely independent and therefore, in one embodiment, may be performed in parallel.

In circumstances where it appears that there might be a GLA signal present, but none is found, i.e., if sufficient energy is present such that one would expect a GLA signal, but a GLA signal is not identified by the end of the GLA alignment segment S1024, then process flow continues to S1022 where selection time is adjusted.

S1026 is the Voltage Angle measurement process. The Voltage Angle measurement process is intended to determine what, if any, difference in time exist between the zero cross, i.e., when the downstream transmitter dispatched its signal, and when the signal was received by the substation receiver.

In a preferred approach, the GLA alignment process results in getting a sharp correlation between the received GLA signal and the reference GLA signal. When a strong correlation signal is present, the FIM can back up and determine that the signal must have been received at time x, even though the system is currently at time t. By virtue of a sharp correlation, between the GLA signal and the reference GLA signal, it is possible to derive an accurate measurement of when the GLA signal arrived at the FIM. This accurate time measurement can be used to bound the extent of data required from the data stream to calculate the zero crossing of the appropriate voltage reference. This is used to perform the voltage angle calculation described above.

In various embodiments, information from the voltage angle measurement S1026 and the demodulation measurement S1028 can be used in the disambiguation step S1030. In such circumstances, both the voltage angle measurement and the demodulation measurement must be performed before the disambiguation step.

The Demodulation process S1028 is intended to demodulate messages on multiple feeder phases over multiple center frequencies. Center frequency is context specific, and depends on the underlying modulation scheme. In one embodiment, a modulator/demodulator (modem) uses a single carrier and the center frequency corresponds to this carrier frequency.

In another embodiment, the modem uses multiple carriers. In one embodiment the data requested from the data stream includes only the message portion of the packet, not the GLA preamble. In one embodiment, demodulation is performed on all feeder phases across all center frequencies. In another embodiment, demodulation is performed on only those feeder phase signals in which a GLA signal was detected.

There are several ways to demodulate over the multiple center frequencies for each relevant feeder phase. In one embodiment, demodulation is performed over all center frequencies until a threshold defined over a demodulator-centric performance metric is exceeded, in which case the demodulation task associated with the channel is terminated.

If the defined threshold is not exceeded, then the results for the center frequency yielding the greatest demodulator-centric metric are preserved for later processing.

In another embodiment, demodulation is performed over all center frequencies and the correct, or optimal, center frequency is derived after the fact. Like the previous embodiment, the optimal center frequency comes from the specification of a demodulator-centric metric.

For a given downstream transmission, the GLA signal may be seen on any number of feeder phases, or it may not be seen on any. A potential cause of this effect is crosstalk between feeders and phases.

The demodulated payload data can contain any of various types of information, including grid measurements. For example, the downstream transmitter can be configured to measure voltage and power consumed locally.

The purpose of the Disambiguation process is to aggregate and prepare the results from the GLA Alignment, Grid Measurement, voltage angle measurement and Demodulation processes, as made across all feeder phases, in preparation for reporting. In one embodiment, the preparation involves sorting all feeder phases based on one or more metrics derived from the aggregated results for the feeder phases. In another embodiment, the preparation involves sorting the feeders and then sorting the phases, separately.

Upon completion of the Disambiguation process, the process continues to the report generation process S1032. The Report Generation process takes the aggregated, sorted output structure generated from the Disambiguation process, formats the data into a serializable data format, and preserves the resulting content. In one embodiment, the content is written to a disk and later preserved in a managed database. In another embodiment, the content is written directly to a managed database.

At the end of the report generation process, the process continues to GLA detection state S1020 with a larger time adjustment adequate to step past the current transmission.

While the invention has been described and illustrated with reference to specific exemplary embodiments, it should be understood that many modifications, combinations, and substitutions can be made without departing from the spirit and scope of the invention. For example, the discussion above mostly discloses applications of the invention with respect to a TDMA communication system, however the invention is not so limited, and other communications systems, e.g., FDMA, can be employed which would require modifying the communication operation and processing to reflect the chosen communication system. Furthermore, although the invention is described with respect to employing a GLA signal the invention is not so limited and other appropriate data burst header data can be employed with a corresponding change in the system to recognize and process the chosen header data. Accordingly, the invention is not to be considered as limited by the foregoing description but is only limited by the scope of the claims.

What is claimed is:

1. A method for determining a phase line on which a transmitter is transmitting, comprising:
receiving, by a receiver, on a first power distribution phase line of a plurality of power distribution phase lines, a first copy of a signal transmitted by one transmitter of a plurality of transmitters;
digitizing the first copy of the signal;
receiving, by the receiver, on a second power distribution phase line of the plurality of power distribution phase lines, a second copy of the signal transmitted by the one transmitter;
digitizing the second copy of the signal;
correlating, by a processing device, the first copy of the signal received on the first power distribution phase line and the second copy of the signal received on the second power distribution phase line with a reference signal; and
determining that the one transmitter transmitted the signal on the first power distribution phase line and not on the second power distribution phase line.

2. The method of claim 1 further comprising generating, by the processing system, the reference signal by generating a plurality of chirps, each chirp comprising a signal spanning a predetermined frequency range.

3. The method of claim 2 wherein generating the reference signal by generating the plurality of chirps, each chirp comprising a signal spanning the predetermined frequency range further comprises generating the reference signal by generating at least ten chirps, each chirp of the at least ten chirps spanning a different non-overlapping predetermined frequency range.

4. The method of claim 3 wherein each chirp of the at least ten chirps spans a non-overlapping predetermined frequency range of 50 Hertz.

5. The method of claim 1 further comprising detecting, on the first power distribution phase line, a transmitted data packet transmitted by the one transmitter that follows the signal, the transmitted data packet comprising data that quantifies a measurement made by the one transmitter.

6. The method of claim 5 wherein detecting, on the first power distribution phase line, the transmitted data packet transmitted by the one transmitter further comprises detecting, on the first power distribution phase line on a high voltage side of a service transformer that steps down voltage on the first power distribution phase line, the transmitted data packet transmitted by the one transmitter on the first power distribution phase line on a low voltage side of the service transformer.

7. The method of claim 1 further comprising storing, in a grid map, data identifying the one transmitter as being coupled to the first power distribution phase line.

8. A receiver for determining a phase line on which a transmitter is transmitting, comprising:
a memory; and
a processor device coupled to the memory and configured to:
receive on a first power distribution phase line of a plurality of power distribution phase lines, a first copy of a signal transmitted by one transmitter of a plurality of transmitters;
digitize the first copy of the signal;
receive on a second power distribution phase line of the plurality of power distribution phase lines, a second copy of the signal transmitted by the one transmitter;
digitize the second copy of the signal;
correlate the first copy of the signal received on the first power distribution phase line and the second copy of the signal received on the second power distribution phase line with a reference signal; and
determine that the one transmitter transmitted the signal on the first power distribution phase line and not on the second power distribution phase line.

9. The receiver of claim 8 wherein the processor device is further configured to generate the reference signal by generating a plurality of chirps, each chirp comprising a signal spanning a predetermined frequency range.

10. The receiver of claim 9 wherein to generate the reference signal by generating the plurality of chirps, each chirp comprising a signal spanning the predetermined frequency range, the processor device is further configured to generate the reference signal by generating at least ten chirps, each chirp of the at least ten chirps spanning a different non-overlapping predetermined frequency range.

11. The receiver of claim 10 wherein each chirp of the at least ten chirps spans a non-overlapping predetermined frequency range of 50 Hertz.

12. The receiver of claim 8 wherein the processor device is further configured to detect, on the first power distribution phase line, a transmitted data packet transmitted by the one transmitter that follows the signal, the transmitted data packet comprising data that quantifies a measurement made by the one transmitter.

13. The receiver of claim 12 wherein to detect, on the first power distribution phase, the transmitted data packet transmitted by the one transmitter, the processor device is further configured to detect, on the first power distribution phase line on a high voltage side of a service transformer that steps down voltage on the first power distribution phase line, the transmitted data packet transmitted by the one transmitter on the first power distribution phase line on a low voltage side of the service transformer.

14. The receiver of claim 8 wherein the processor device is further configured to store, in a grid map, data identifying the one transmitter as being coupled to the first power distribution phase line.

* * * * *